(12) United States Patent
Kitahara et al.

(10) Patent No.: US 12,399,035 B2
(45) Date of Patent: Aug. 26, 2025

(54) TRAFFIC SIGNAL RECOGNITION DEVICE, TRAFFIC SIGNAL RECOGNITION METHOD AND VEHICLE CONTROL DEVICE

(71) Applicant: DENSO CORPORATION, Kariya (JP)

(72) Inventors: Genki Kitahara, Kariya (JP); Tomohito Terazawa, Kariya (JP); Yasuhiko Mukai, Kariya (JP)

(73) Assignee: DENSO CORPORATION, Kariya (JP)

( * ) Notice: Subject to any disclaimer, the term of this patent is extended or adjusted under 35 U.S.C. 154(b) by 289 days.

(21) Appl. No.: 18/163,769

(22) Filed: Feb. 2, 2023

(65) Prior Publication Data

US 2023/0175863 A1 Jun. 8, 2023

Related U.S. Application Data

(63) Continuation of application No. PCT/JP2021/028302, filed on Jul. 30, 2021.

(30) Foreign Application Priority Data

Aug. 7, 2020 (JP) .................... 2020-134991

(51) Int. Cl.
 *G01C 21/00* (2006.01)
 *G06V 20/58* (2022.01)

(52) U.S. Cl.
 CPC ..... *G01C 21/3885* (2020.08); *G01C 21/3848* (2020.08); *G06V 20/584* (2022.01)

(58) Field of Classification Search
 CPC .............. G01C 21/3885; G01C 21/3848; G01C 21/30; G06V 20/584; B60W 40/02; G08G 1/09; G08G 1/16
 See application file for complete search history.

(56) References Cited

U.S. PATENT DOCUMENTS

| | | | |
|---|---|---|---|
| 10,773,732 B1* | 9/2020 | Alexander | G05D 1/0212 |
| 2016/0054138 A1* | 2/2016 | Kojo | G06T 7/60 |
| | | | 701/423 |
| 2016/0305794 A1* | 10/2016 | Horita | G06V 20/584 |

(Continued)

FOREIGN PATENT DOCUMENTS

| | | | |
|---|---|---|---|
| JP | H07-077428 A | | 3/1995 |
| JP | 2007-008404 A | | 1/2007 |

(Continued)

OTHER PUBLICATIONS

Machine Translation of JP 2016-112984 retrieved from Espacenet on Jan. 11, 2025 (Year: 2025).*

(Continued)

*Primary Examiner* — Thomas Ingram
(74) *Attorney, Agent, or Firm* — Maschoff Brennan

(57) ABSTRACT

A traffic signal recognition device recognizes a traffic signal present around a vehicle. The device acquires a position of the vehicle, and acquires a position of the traffic signal registered in map data based on the acquired position of the vehicle. The device acquires a position of a lighting device detected using an image frame captured by an in-vehicle camera. The device determines whether the lighting device corresponds to the traffic signal based on a difference between the acquired position of the traffic signal and the acquired position of the lighting device.

12 Claims, 7 Drawing Sheets

(56) References Cited

U.S. PATENT DOCUMENTS

| | | | | |
|---|---|---|---|---|
| 2017/0103275 A1* | 4/2017 | Yamanoi | .............. | G06V 20/588 |
| 2017/0350713 A1* | 12/2017 | Bhatia | .................. | G05D 1/0274 |
| 2018/0348762 A1* | 12/2018 | Hilnbrand | .............. | G01C 21/30 |
| 2018/0349717 A1* | 12/2018 | Yamanoi | ................. | G06F 16/29 |
| 2019/0244041 A1* | 8/2019 | Kawanai | .............. | G06V 20/584 |
| 2021/0027076 A1* | 1/2021 | Hayashi | ............... | G06V 20/584 |

FOREIGN PATENT DOCUMENTS

| | | |
|---|---|---|
| JP | 2016-112984 A | 6/2016 |
| JP | 2017-182297 A | 10/2017 |
| JP | 2018-081405 A | 5/2018 |
| JP | 6331811 B2 | 5/2018 |
| JP | 2020-061052 A | 4/2020 |

OTHER PUBLICATIONS

Machine Translation of JP 2018-081405 retrieved from Espacenet on Jan. 11, 2025 (Year: 2025).*

* cited by examiner

TRAFFIC SIGNAL RECOGNITION DEVICE, TRAFFIC SIGNAL RECOGNITION METHOD AND VEHICLE CONTROL DEVICE

CROSS REFERENCE TO RELATED APPLICATIONS

The present application is a continuation application of International Patent Application No. PCT/JP2021/028302 filed on Jul. 30, 2021, which designated the U.S. and claims the benefit of priority from Japanese Patent Application No. 2020-134991 filed on Aug. 7, 2020. The entire disclosures of all of the above applications are incorporated herein by reference.

TECHNICAL FIELD

The present disclosure relates to a technique for detecting a traffic signal.

BACKGROUND

A method for detecting a traffic signal by estimating a position of the traffic signal by using map data is known.

SUMMARY

According to at least one embodiment, a traffic recognition device is used for recognizing a traffic signal present around a vehicle. The traffic signal recognition device includes a vehicle position acquisition unit, an on-map position acquisition unit, an observed position acquisition unit and a traffic signal recognition unit. The vehicle position acquisition unit acquires a position of the vehicle. The on-map position acquisition unit acquires an on-map traffic signal position based on the position of the vehicle acquired by the vehicle position acquisition unit. The on-map traffic signal position is a position of the traffic signal registered in map data. The observed position acquisition unit acquires an observed lighting position that is position information of a lighting device detected using an image frame captured by an in-vehicle camera. The traffic signal recognition unit determines whether the lighting device corresponds to the traffic signal based on a proximity that is a difference between the on-map traffic signal position acquired by the on-map position acquisition unit and the observed lighting position acquired by the observed position acquisition unit.

According to at least one embodiment, a traffic signal recognition method is used for recognizing a traffic signal present around a vehicle, and is executed by at least one processor. In the traffic signal recognition method, a position of the vehicle is acquired, and an on-map traffic signal position is acquired based on the acquired position of the vehicle. The on-map traffic signal position is a position of the traffic signal registered in map data. In the traffic signal recognition method, an observed lighting position that is position information of a lighting device detected using an image frame captured by an in-vehicle camera is acquired. In the traffic signal recognition method, it is determined whether the lighting device corresponds to the traffic signal based on a proximity that is a difference between the acquired on-map traffic signal position and the acquired observed lighting position.

According to at least one embodiment, a vehicle control device is used for performing a vehicle control according to a recognition state of a traffic signal present around a vehicle. The vehicle control device includes a vehicle position acquisition unit, an on-map position acquisition unit, an observed position acquisition unit, and a traffic signal recognition unit. The vehicle position acquisition unit acquires a position of the vehicle. The on-map position acquisition unit acquires an on-map traffic signal position based on a position of the vehicle acquired by the vehicle position acquisition unit. The on-map traffic signal position is a position of the traffic signal registered in map data. The observed position acquisition unit acquires an observed lighting position that is position information of a lighting device detected using an image frame captured by an in-vehicle camera. The traffic signal recognition unit determines whether the lighting device corresponds to the traffic signal based on a proximity that is a difference between the on-map traffic signal position acquired by the on-map position acquisition unit and the observed lighting position acquired by the observed position acquisition unit. The vehicle control device notifies a user that the vehicle control is not performed when a remaining distance from the vehicle to the on-map traffic signal position is less than a first predetermined distance and a traffic signal has not been recognized.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
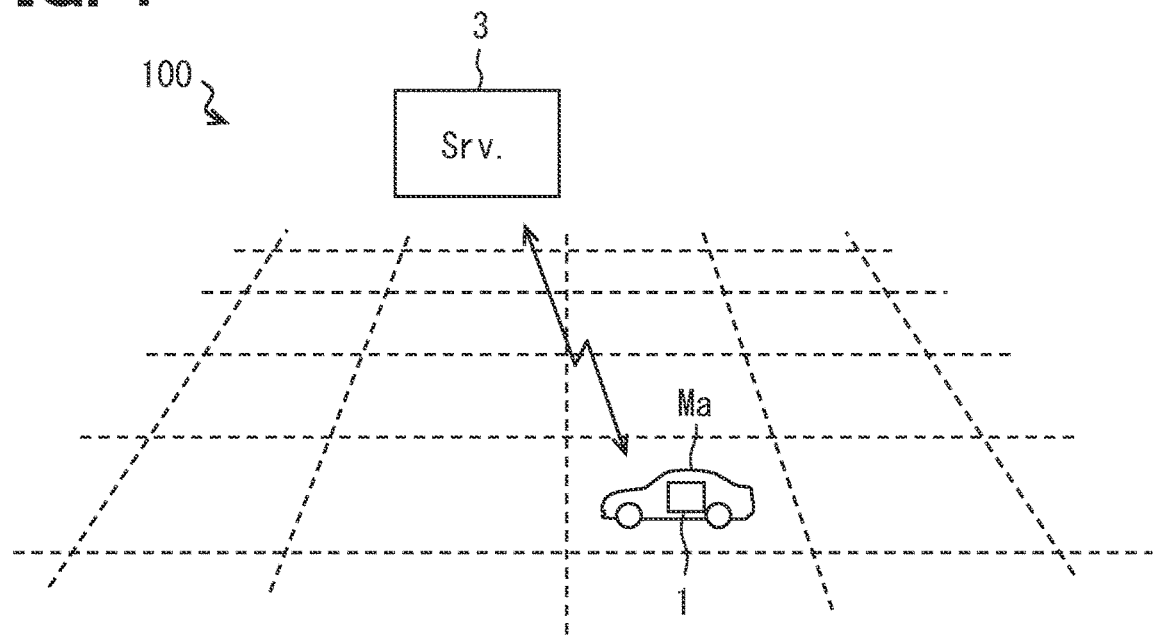
FIG. 1 is a view for explaining an overall configuration of a map cooperation system.

To begin with, examples of relevant techniques will be described. As a comparative example, a method for detecting a traffic signal is introduced. In the method, a position of the traffic signal is estimated by using map data, and image recognition processing is performed on an image region corresponding to the estimated position of the traffic signal. The estimated position of the traffic signal is calculated from an estimated position of a vehicle and the map data. When no traffic signal is found in an image region set as a detection region of a traffic signal, the image region as the detection region is slid to a far side, specifically, downward from an upper end of the image, and searching is performed again.

For example, at night, a housing of a traffic signal may not be captured in the image, and only a lit portion may be captured in the image. In such a case where the housing of the traffic signal is not captured, it is difficult to distinguish a lighting device corresponding to the traffic signal from other lighting devices in the image recognition processing, and thereby it is difficult to detect the traffic signal. Other lighting devices are, for example, a street lamp, a tail lamp of a preceding vehicle, a headlight of an oncoming vehicle and a commercial signboard that emits light.

The comparative example is set on the premise that an image of a lighting device corresponding to the traffic signal is captured to be distinguishable from the other lighting devices. In other words, the comparative example does not assume a situation where it is difficult to distinguish the traffic signal from the other lighting devices. Therefore, in a case where multiple lighting devices (i.e., light sources) are detected in the detection region, it is not possible to determine which lighting device actually corresponds to the traffic signal.

In contrast to the comparative example, a detection accuracy of a traffic signal can be improved in the present disclosure.

According to an aspect of the present disclosure, a traffic recognition device is used for recognizing a traffic signal present around a vehicle. The traffic signal recognition device includes a vehicle position acquisition unit, an on-map position acquisition unit, an observed position acquisition unit and a traffic signal recognition unit. The vehicle position acquisition unit is configured to acquire a position of the vehicle. The on-map position acquisition unit is configured to acquire an on-map traffic signal position based on the position of the vehicle acquired by the vehicle position acquisition unit. The on-map traffic signal position is a position of the traffic signal registered in map data. The observed position acquisition unit is configured to acquire an observed lighting position that is position information of a lighting device detected using an image frame captured by an in-vehicle camera. The traffic signal recognition unit is configured to determine whether the lighting device corresponds to the traffic signal based on a proximity that is a difference between the on-map traffic signal position acquired by the on-map position acquisition unit and the observed lighting position acquired by the observed position acquisition unit.

In the above configuration, the proximity is used as a base for determining whether the detected lighting device is the traffic signal. According to such a configuration, even when it is difficult to determine whether the detected lighting device is the traffic signal, determination accuracy can be enhanced. Even when multiple lighting devices are detected, it is possible to specify a lighting device corresponding to the traffic signal, by comparing the proximity of each lighting device. Therefore, the detection accuracy of the traffic signal can be improved.

According to another aspect of the present disclosure, a traffic signal recognition method is used for recognizing a traffic signal present around a vehicle, and is executed by at least one processor. In the traffic signal recognition method, a position of the vehicle is acquired, and an on-map traffic signal position is acquired based on the acquired position of the vehicle. The on-map traffic signal position is a position of the traffic signal registered in map data. In the traffic signal recognition method, an observed lighting position that is position information of a lighting device detected using an image frame captured by an in-vehicle camera is acquired. Further, it is determined whether the lighting device corresponds to the traffic signal based on a proximity that is a difference between the acquired on-map traffic signal position and the acquired observed lighting position.

According to the above configuration, the detection accuracy of the traffic signal can be improved by an action and effect similar to those of the traffic signal recognition device.

According to another aspect of the present disclosure, a vehicle control device is used for performing a vehicle control according to a recognition state of a traffic signal present around a vehicle. The vehicle control device includes a vehicle position acquisition unit, an on-map position acquisition unit, an observed position acquisition unit, and a traffic signal recognition unit. The vehicle position acquisition unit is configured to acquire a position of the vehicle. The on-map position acquisition unit is configured to acquire an on-map traffic signal position based on a position of the vehicle acquired by the vehicle position acquisition unit. The on-map traffic signal position is a position of the traffic signal registered in map data. The observed position acquisition unit is configured to acquire an observed lighting position that is position information of a lighting device detected using an image frame captured by an in-vehicle camera. The traffic signal recognition unit is configured to determine whether the lighting device corresponds to the traffic signal based on a proximity that is a difference between the on-map traffic signal position acquired by the on-map position acquisition unit and the observed lighting position acquired by the observed position acquisition unit. The vehicle control device is configured to notify a user that the vehicle control is not performed when a remaining distance from the vehicle to the on-map traffic signal position is less than a first predetermined distance and a traffic signal has not been recognized.

The above-described vehicle control device includes the configuration of the above-described traffic signal recognition device. Therefore, according to the above configuration, the detection accuracy of the traffic signal can be improved, and vehicle control according to the recognition state can be performed.

An embodiment of a vehicle control system 1 according to the present disclosure will be described with reference to the drawings. In the following description, a region where left-hand traffic is legislated will be described as an example. In an area where right-hand traffic is legislated, the left and right may simply be reversed. Hereinafter, blue light of traffic signals indicates a lighting state for permitting passage, and yellow light and red light indicate a lighting state for instructing stop. The traffic signals can include a lighting device that displays an arrow. The present disclosure can be appropriately modified and implemented so as to conform to the laws, regulations, and conventions of an area where the vehicle control system 1 is used.

<Overview of Overall Configuration>

FIG. 1 is a view illustrating an example of a schematic configuration of a map cooperation system 100 including the vehicle control system 1 according to the present disclosure. As illustrated in FIG. 1, the map cooperation system 100 includes the vehicle control system 1 constructed in a vehicle Ma, and a map server 3. Although only one vehicle Ma installed with the vehicle control system 1 is illustrated in FIG. 1, there may be a plurality of vehicles Ma installed with the vehicle control system 1. That is, there may be a plurality of vehicles constituting the map cooperation system 100.

The vehicle control system 1 can be installed on various vehicles Ma that can travel on a road. The vehicle Ma may also be a two-wheeled vehicle, a three-wheeled vehicle, or the like in addition to a four-wheeled vehicle. A motorized bicycle can also be included in the two-wheeled vehicle. The vehicle Ma may be an owner car owned by an individual, or may be a vehicle provided for a car sharing service or a vehicle rental service (a so-called rental car). The vehicle Ma may also be a service car. The service cars include a taxi, a route bus, a coach bus, and the like. The taxi or the bus may also be a robot taxi or the like on which no driver is on board.

Hereinafter, an own vehicle refers to one vehicle Ma installed with the vehicle control system 1. An occupant (that is, a driver's seat occupant) seated in a driver's seat of the own vehicle is also referred to as a user. Concepts of the driver's seat occupant also include an operator who has authority to remotely operate the own vehicle. Note that, front and rear, left and right, and up and down directions in the following description are defined with reference to the own vehicle. Specifically, the front-rear direction corresponds to a longitudinal direction of the own vehicle. The left-right direction corresponds to a width direction of the own vehicle. The up-down direction corresponds to a vehicle height direction. According to another aspect, the up-down direction corresponds to a direction perpendicular to a plane parallel to the front-rear direction and the left-right direction.

The vehicle control system 1 performs wireless communication with the map server 3 to download partial map data, which is local high-precision map data, from the map server 3, and uses the partial map data for driving assistance, automated driving, and navigation.

<Regarding Map Data>

Here, first, the map data held by the map server 3 will be described. The map data corresponds to map data indicating a road structure, position coordinates of a feature arranged along a road, and the like with accuracy allowing use for automated driving. The map data includes road network data, lane network data, feature data, static POI data, and dynamic POI data. The individual pieces of data are hierarchically configured. The road network data includes a link ID, a link length, the number of lanes, a road attribute, and connection node information (for example, a node ID) for each road link, and a node ID, position coordinates, and connection link information (for example, a link ID) for each road node.

The road attribute includes, for example, a road name, a road type, a road width, lane number information indicating the number of lanes, a speed limit value, and the like. The link data may also include data indicating a road type such as a limited highway or an ordinary road. Here, the limited highway is a road where entry of pedestrians and bicycles is prohibited, and refers to, for example, a toll road such as an expressway. The link data may include attribute information indicating whether or not the road allows autonomous traveling.

The lane network data includes a lane ID, a link ID at a lane level, a link length, and connection node information, and a node ID, position coordinates, and connection link information (for example, a link ID) for each lane node. The link information at the lane level included in the lane network data is associated with the road link included in the road network data.

The feature data includes road edge data, road marking data, and three-dimensional object data. The road edge data includes a coordinate point group indicating a position of a road edge.

The road marking data is data indicating an installation position and a type of a road marking. The road marking refers to a paint drawn on a road surface for traffic regulations or instructions on the road. The road marking can be referred to as a road surface paint in one aspect. For example, a lane division line indicating a boundary of lanes, a crosswalk, a stop line, a hatched zone, a safety zone, a regulation arrow, and the like are included in the road marking. The road marking can also include a road surface paint indicating a road name. A line, a symbol, and a character provided on a road surface correspond to the road marking. The road marking can include not only a paint but also a color difference of the road surface itself, a line, a symbol, and a character formed by a road stud, a stone, and the like.

The road marking data includes lane marking data that is data about lane division lines, and interspersed road marking data that is data about other road markings. The lane marking data is data about a linear marking continuously extending along a road, whereas the interspersed road marking data is data about a road marking interspersed in necessary places such as a temporary stop line and a speed limit marking. The interspersed road marking data indicates an installation position and a type of a predetermined road marking other than the lane marking.

The lane marking data is data about a lane division line. The lane division line also includes a lane division line realized by a road stud such as a chatter bar or a Botts' dots. The lane marking data includes a lane marking ID for each lane division line and a coordinate point group representing an installed portion. The lane marking data includes pattern information such as a broken line, a solid line, and a road stud. The lane division line is also referred to as a lane mark or a lane marker. Hereinafter, the lane marking refers to a boundary line of lanes. The lane markings can include a roadway outer line, a medial line (a so-called center line), and the like. The road edge data and the lane marking data are associated with lane information such as a lane ID and a link ID at a lane level, for example. Position and shape information of the road edge and the lane marking may be expressed by a cubic spline curve.

The three-dimensional object data represents a position and a type of a three-dimensional structure installed along a road. The three-dimensional structure installed along the road is, for example, a traffic sign, a commercial signboard, a pole, a guardrail, a curb, a tree, a utility pole, a traffic signal, or the like. The traffic sign refers to, for example, a signboard given with at least one of a symbol, a character string, and a pattern acting as a regulation sign, a guide sign, a warning sign, an instruction sign, or the like. The guide signs include a destination signboard, a region name signboard indicating a region name, a road name signboard indicating a road name, and an advance notice signboard for giving an advance notice of an entrance of an expressway, a service area, and the like. A shape and a position of each three-dimensional structure are represented by, for example, a coordinate point group. Some or all of the above-described structures installed along a road and the predetermined road marking such as a temporary stop line are used as a landmark to be described later. That is, the map data includes data about an installation position and a type of the landmark.

The static POI data is data about a static map element other than the above. Here, the static map element refers to, for example, a feature that is required to be updated within one week to one week. In other words, the static map element refers to a map element whose position and existence state do not change in about several minutes to several hours. The static POI data includes a tollgate, a tunnel, a branch point for exiting a main line of an expressway, a junction point, and the like. Each piece of static POI data includes a type and position information. The static POI data can be, for example, data about a static map element not included in a detection target object of a front camera 11 described later.

The dynamic POI data is data indicating a position of a dynamic map element. The dynamic map element refers to a map element whose position and existence state change with a time change of several minutes to several hours. The dynamic map elements include, for example, a traffic jam section, a construction section, a disabled car, a fallen object, an accident point, a lane restriction, and the like. The dynamic map elements can also include a heavy rain area in which local heavy rainfall is occurring, a road surface frozen section in which a road surface is frozen, a snowfall point, and the like. The dynamic POI data and the static POI data can be added later by a server or an operator performing specific processing on map data generated on the basis of probe data, among data indicating positions and types of features and events that affect a travel plan of the vehicle.

The map data described above may also be three-dimensional map data including a point group of feature points of a road shape and a structure. The three-dimensional map data corresponds to map data representing a position of a feature such as a road edge, a lane division line, or a traffic sign in three-dimensional coordinates. The three-dimensional map may be generated on the basis of a captured image by road experience management (REM). The map data may include a traveling trajectory model. The traveling trajectory model is trajectory data generated by statistically integrating travel trajectories of a plurality of vehicles. The traveling trajectory model is obtained by averaging travel trajectories for each lane, for example. The traveling trajectory model corresponds to data indicating a traveling trajectory serving as a reference at a time of executing steering assistance or at a time of executing automated driving. The steering assistance function may be referred to as lane tracing assist (LTA) or lane trace control (LTC). The LTA and the LTC correspond to vehicle control as driving assistance for causing the own vehicle to travel along a lane or a trajectory of a preceding vehicle.

The map data is sectioned into a plurality of patches and managed. Each patch corresponds to map data of different areas. For example, as illustrated in FIG. 1, the map data is stored in units of map tiles obtained by segmenting a map recording region into a rectangular shape. The map tile corresponds to a subordinate concept of the patch described above. Each map tile is assigned with information indicating a real world region to which the map tile corresponds. The information indicating the real world region is expressed by, for example, latitude, longitude, altitude, and the like. A length of one side of the map tile is set to several hundred meters. To each map tile, a tile ID that is a unique identifier is assigned. The map data for each patch or each map tile is a part of the entire map recording region, in other words, local map data. The map tile corresponds to partial map data. The map server 3 distributes partial map data corresponding to a position of the vehicle control system 1 on the basis of a request from the vehicle control system 1.

The size of one side of the map tile is not limited to several hundred meters, and may be 1 km, 2 km, or the like. The shape of the map tile may not be a rectangular shape. The map tile may also be a hexagon, a circle, or the like. Each map tile may be set to partially overlap with an adjacent map tile. That is, each map tile may be set to overlap with another map tile near a boundary. The map recording region may be the entire country in which the vehicle is used, or may be only a part of an area. For example, the map recording region may be only an area where automated driving of a general vehicle is permitted or an area where an automated driving movement service is provided. In addition, a segmentation mode of the map data may be defined by a data size. In other words, the map recording region may be segmented and managed in a range defined by the data size. In this case, each patch is set such that a data amount is less than a predetermined value. According to such a mode, the data size in one distribution can be set to a certain value or less.

The above-described map data is updated as needed by performing integrating processing on probe data uploaded from a plurality of vehicles, for example. The map data handled by the map server 3 of the present embodiment is a probe data map (hereinafter, a PD map) generated and updated by integrating probe data observed by a plurality of vehicles, but is not limited thereto. The map data handled by the map server 3 may also be a high-precision map (hereinafter, an HD map) generated on the basis of a result of a fixed-point surveying meter, a result of high-precision GPS surveying, or data measured by a dedicated probe car equipped with LiDAR or the like. LiDAR is an abbreviation of Light Detection and Ranging/Laser Imaging Detection and Ranging. The map data handled by the map cooperation system 100 may be navigation map data that is map data for navigation on condition that feature data such as a traffic signal and a landmark is included. The navigation map data is lower in accuracy than the high-precision map data, and corresponds to map data having a smaller amount of information on a road shape than the high-precision map data.

<Configuration of Vehicle Control System 1>

Figure 2:
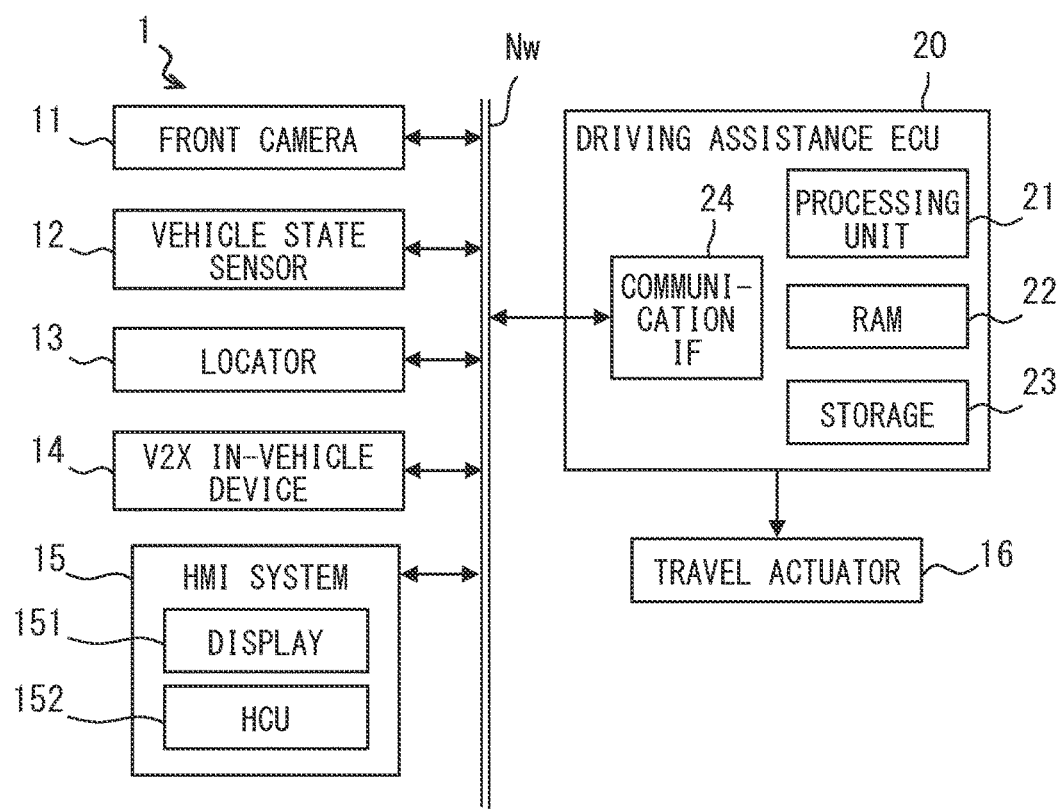
FIG. 2 is a block diagram illustrating a configuration of a vehicle control system.

As illustrated in FIG. 2, the vehicle control system 1 includes the front camera 11, a vehicle state sensor 12, a locator 13, a V2X in-vehicle device 14, an HMI system 15, a travel actuator 16, and a driving assistance ECU 20. ECU in member names is an abbreviation of an electronic control unit, and means an electronic control device. HMI is an abbreviation of human machine interface. V2X is an abbreviation of Vehicle to X (everything), and refers to a communication technology that connects various things to each other. "V" of V2X refers to an automobile as the own vehicle, and "X" can refer to various entities other than the own vehicle, such as a pedestrian, other vehicle, a road facility, a network, and a server.

The various devices or sensors constituting the vehicle control system 1 described above are connected, as nodes, to an in-vehicle network Nw, which is a communication network constructed in the vehicle. Nodes connected to the in-vehicle network Nw can communicate with each other. Specific devices may be configured to be able to directly communicate with each other without passing through the in-vehicle network Nw. In FIG. 2, the in-vehicle network Nw is configured as a bus type, but is not limited thereto. The network topology may also be a mesh type, a star type, a ring type, or the like. As a standard of the in-vehicle network Nw, for example, various standards can be adopted such as a controller area network (CAN is a registered trademark), Ethernet (registered trademark), and FlexRay (registered trademark).

Figure 3:
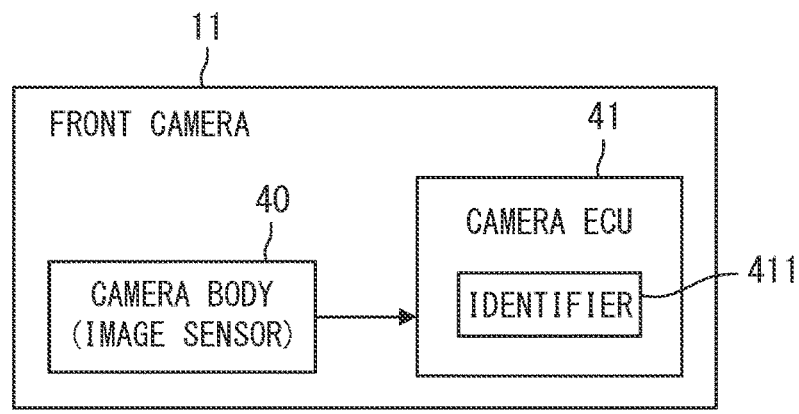
FIG. 3 is a block diagram illustrating a configuration of a front camera.

The front camera 11 is a camera that captures an image of the front of the vehicle at a predetermined angle of view. The front camera 11 is disposed at, for example, an upper end part of a windshield inside a vehicle compartment, a front grille, a roof top, or the like. As illustrated in FIG. 3, the front camera 11 includes a camera body 40 that generates an image frame, and a camera ECU 41 which is an ECU that detects a predetermined detection target object by performing recognition processing on the image frame generated by the camera body 40. The camera body 40 is a configuration including at least an image sensor and a lens. The camera body 40 generates and outputs captured image data at a predetermined frame rate such as 60 fps. The camera ECU 41 is realized using an image processing chip including a central processing unit (CPU), a graphics processing unit (GPU), and the like. The camera ECU 41 includes an identifier 411 as a functional block. The identifier 411 is a configuration that identifies a type of an object on the basis of a feature amount vector of an image generated by the camera body 40. As the identifier 411, for example, a convolutional neural network (CNN), a deep neural network (DNN), or the like to which deep learning is applied can be used.

The detection target objects of the front camera 11 include, for example, a mobile body such as a pedestrian or other vehicle. Other vehicles include a bicycle, a motorized bicycle, and a motorcycle. The front camera 11 is also configured to be able to detect a lighting device. The lighting device here is a configuration that emits light, such as a traffic signal, a headlight of a vehicle, a taillight, a street lamp, or the like. The description of the lighting device can be replaced with an external light source or a light source unit.

The front camera 11 is configured to be able to detect a predetermined feature. The features to be detected by the front camera 11 include a road edge, a road marking, and a structure installed along a road. The road markings include a lane marking, a temporary stop line, and the like. The structures installed along a road are, for example, a guardrail, a curb, a tree, a utility pole, a traffic sign, a traffic signal, and the like.

Some or all of features to be detected by the front camera 11 are used as a landmark in the driving assistance ECU 20. The landmark refers to a feature that can be used as a mark for specifying a position of the own vehicle on the map. As the landmark, for example, at least one can be adopted among a signboard corresponding to a traffic sign such as a regulation sign or a guide sign, a traffic signal, a pole, a guide plate, a temporary stop line, a lane marking, and the like.

Among the landmarks, a feature that can be used as a mark for performing position estimation in a longitudinal direction (hereinafter, longitudinal position estimation) is also referred to as a landmark for longitudinal position estimation. The longitudinal direction here corresponds to the front-rear direction of the vehicle. The longitudinal direction corresponds to a road extension direction, which is a direction in which a road extends when viewed from the own vehicle in a straight road section. As the landmark for longitudinal position estimation, for example, a map element discretely arranged along a road can be adopted, such as a traffic sign such as a destination signboard or a road marking such as a temporary stop line. A feature that can be used as a mark for performing position estimation in a lateral direction of the vehicle (hereinafter, lateral position estimation) is also referred to as a landmark for lateral position estimation. The lateral direction here corresponds to a width direction of the road. The landmark for lateral position estimation indicates a feature continuously present along a road, such as a road edge or a lane marking.

Hereinafter, the landmark mainly refers to a feature that can be used as a mark for estimating a longitudinal position of the vehicle. Of course, as described above, the concept of the landmark can include a lane marking and the like. The type of feature used as the landmark can be changed as appropriate. As the landmark, it is preferable to adopt a feature having a small temporal change and having a size that allows image recognition even from a point 30 m or more away, such as a traffic sign such as a destination signboard or a road marking. The front camera 11 only needs to be configured to be able to detect a feature of a type set as the landmark.

In the camera ECU 41, an image processor constituting the camera ECU 41 separates and extracts a background and a detection target object from a captured image, on the basis of image information including color, a luminance, contrast related to the color and the luminance, and the like. The camera ECU 41 calculates a position and a direction of various detection target objects from an image including structure from motion (SfM) information. A relative position (a distance and a direction) of the detection object with respect to the own vehicle may be specified on the basis of a size and an orientation (for example, an inclination degree) of the target object in the image. The camera ECU 41 recognizes a curvature, a width, and the like of a road on the basis of a regression curve of a detection point indicating a lane division line and a road edge.

The camera ECU 41 outputs a signal indicating a relative position, a type, a moving speed, and the like of each detected object as a detection result. An identification result of the type of the detection object includes a correct answer probability value indicating likelihood of the identification result. For example, the correct answer probability value of the identification result for a lighting device includes a probability of being a traffic signal, a probability of being a tail lamp, a probability of being a street lamp, and the like. When the probability of being a traffic signal becomes higher, the probability of being another type becomes lower. In a case where a housing of the traffic signal cannot be seen, such as at night, the probability value that the detection object is the traffic signal may be lower than that in the daytime, even if the detection object is truly the traffic signal. The probability value for each type can be a score indicating a degree of matching of feature amounts. An output signal of the camera ECU 41 is inputted to the driving assistance ECU 20 via the in-vehicle network Nw. Hereinafter, for convenience, a probability that a type of the detected lighting device is a traffic signal, which is calculated by the camera ECU 41, is also referred to as a traffic signal probability P. A detection result of the front camera 11 can also be replaced with a recognition result or an identification result.

The front camera 11 may be configured to provide an image frame to be used for object recognition, to the driving assistance ECU 20 or the like via the in-vehicle network Nw. The image frame corresponds to observation data of the front camera 11. The observation data corresponds to raw data observed by a sensor or data before the recognition processing is executed. The object recognition processing based on the observation data may be executed by an ECU outside the sensor, such as the driving assistance ECU 20. For example, a part of the functions of the camera ECU 41 (mainly the object recognition function) may be provided in the driving assistance ECU 20. In this case, the front camera 11 may simply provide image data as the observation data to the driving assistance ECU 20.

The vehicle state sensor 12 is a sensor group that detects a state quantity related to travel control of the own vehicle. The vehicle state sensor 12 includes a vehicle speed sensor, a steering sensor, an acceleration sensor, a yaw rate sensor, and the like. The vehicle speed sensor detects a vehicle speed of the own vehicle. The steering sensor detects a steering angle of the own vehicle. The acceleration sensor detects acceleration such as longitudinal acceleration and lateral acceleration of the own vehicle. The yaw rate sensor detects an angular velocity of the own vehicle. The type of sensor used as the vehicle state sensor 12 by the vehicle control system 1 may be appropriately designed, and it is not necessary to include all the sensors described above. The vehicle state sensor 12 can include, for example, a rain sensor that detects rainfall or an illuminance sensor that detects brightness of the outside.

The locator 13 is a device that generates highly accurate position information and the like of the own vehicle, by complex positioning combining a plurality of pieces of information. The locator 13 is configured using, for example, a GNSS receiver. The GNSS receiver is a device that sequentially detects a current position of a global navigation satellite system (GNSS) receiver, by receiving a navigation signal transmitted from a positioning satellite constituting the GNSS. For example, when the GNSS receiver has received navigation signals from four or more positioning satellites, the GNSS receiver outputs a positioning result every 100 milliseconds. GPS, GLONASS, Galileo, IRNSS, QZSS, Beidou, or the like can be employed as the GNSS.

The locator 13 sequentially measures a position of the own vehicle by combining a positioning result of the GNSS receiver and an output of the inertial sensor. For example, in a case where the GNSS receiver cannot receive a GNSS signal such as in a case of being in a tunnel, the locator 13 performs dead reckoning (that is, autonomous navigation) using a yaw rate and a vehicle speed. The locator 13 may perform dead reckoning by using an output of an acceleration sensor or a gyro sensor. The vehicle position information obtained by positioning is outputted to the in-vehicle network Nw, and used by the driving assistance ECU 20 and the like. Note that, some of the functions of the locator 13 may be provided in the driving assistance ECU 20.

The V2X in-vehicle device 14 is a device for the own vehicle to perform wireless communication with another device. The V2X in-vehicle device 14 includes a wide-area communicator and a narrow-area communicator as communication modules. The wide-area communicator is a communication module for performing wireless communication conforming to a predetermined wide-area wireless communication standard. As the wide-area wireless communication standard here, for example, various standards such as long term evolution (LTE), 4G, and 5G can be adopted. In addition to communication via a wireless base station, the wide-area communicator may be configured to be able to perform wireless communication directly with another device, in other words, without going through the base station, by a method conforming to the wide-area wireless communication standard. That is, the wide-area communicator may be configured to perform cellular V2X. The own vehicle becomes a connected car connectable to the Internet by installation of the V2X in-vehicle device 14. For example, the driving assistance ECU 20 can download and use high-precision map data corresponding to a current position from a map server, in cooperation with the V2X in-vehicle device 14.

The narrow-area communicator included in the V2X in-vehicle device 14 is a communication module for directly performing wireless communication with a roadside device or other mobile body present around the own vehicle, in accordance with a narrow-area communication standard that is a communication standard in which a communication distance is limited to several hundred meters or less. Other mobile bodies are not limited to only a vehicle, and can include a pedestrian, a bicycle, and the like. As the narrow-area communication standard, any standard such as wireless access in vehicular environment (WAVE) standard disclosed in IEEE 1609 or dedicated short range communications (DSRC) standard can be adopted. The roadside device is a communication device installed outside the vehicle, for example, along a road.

The HMI system 15 is a system that provides an input interface function of receiving a user operation and an output interface function of presenting information to the user. The HMI system 15 includes a display 151 and an HMI control unit (HCU) 152. As a means for presenting information to the user, a speaker, a vibrator, an illumination device (for example, an LED), or the like can be adopted in addition to the display 151.

The display 151 is a device that displays an image. The display 151 is, for example, a so-called center display provided at an uppermost part in a central part of an instrument panel in the vehicle width direction. The display 151 can perform full-color display, and can be realized by using a liquid crystal display, an organic light emitting diode (OLED) display, a plasma display, or the like. The display 151 may also be a head-up display that displays a virtual image on a part of a windshield in front of a driver's seat. The display 151 may also be a meter display.

The HCU 152 is a configuration that integrally controls information presentation to the user. The HCU 152 is realized by using, for example, a processor such as a CPU or a GPU, a random access memory (RAM), a flash memory, and the like. The HCU 152 controls a display screen of the display 151 on the basis of information provided from the driving assistance ECU 20 or a signal from an input device (not illustrated). For example, the HCU 152 displays an icon image indicating an execution state of driving assistance on the display 151, on the basis of a request from the driving assistance ECU 20. A medium for information presentation to the user is not limited to the display 151. The HCU 152 may be configured to present information to the user by using a speaker or the like.

The travel actuator 16 is actuators for traveling. The travel actuator 16 includes, for example, a brake actuator as a braking device, an electronic throttle, a steering actuator, and the like. The steering actuator also includes an electric power steering (EPS) motor. The travel actuator 16 is controlled by the driving assistance ECU 20. A steering ECU that performs steering control, a power unit control ECU that performs acceleration/deceleration control, a brake ECU, and the like may be interposed between the driving assistance ECU 20 and the travel actuator.

The driving assistance ECU 20 is an ECU that assists a driving operation of the driver's seat occupant on the basis of a detection result of the front camera 11. For example, the driving assistance ECU 20 controls the travel actuator 16 on the basis of a detection result of the front camera 11, to execute some or all of the driving operations instead of the driver's seat occupant. The driving assistance ECU 20 may also be an automated driving device that causes the own vehicle to autonomously travel on the basis of an input of an autonomous traveling instruction by the user.

The driving assistance ECU 20 is mainly configured with a computer including a processing unit 21, a RAM 22, a storage 23, a communication interface 24, a bus connecting these components, and the like. The processing unit 21 is hardware that is for arithmetic processing and is connected to the RAM 22. The processing unit 21 is a configuration including at least one arithmetic core such as a CPU. The processing unit 21 executes various processes by accessing the RAM 22. The processing unit 21 corresponds to a processor. The storage 23 is a configuration including a nonvolatile storage medium such as a flash memory. The storage 23 stores a driving assistance program as a program executed by the processing unit 21. Execution of the above program by the processing unit 21 corresponds to execution of a driving assistance method including a traffic signal recognition method, as a method corresponding to the driving assistance program. The communication interface 24 is a circuit for communicating with other devices via the in-vehicle network Nw. The communication interface 24 may simply be realized by using an analog circuit element, an IC, or the like. The driving assistance ECU 20 corresponds to a traffic signal recognition device and a vehicle control device.

<Driving Assistance ECU 20>

Figure 4:
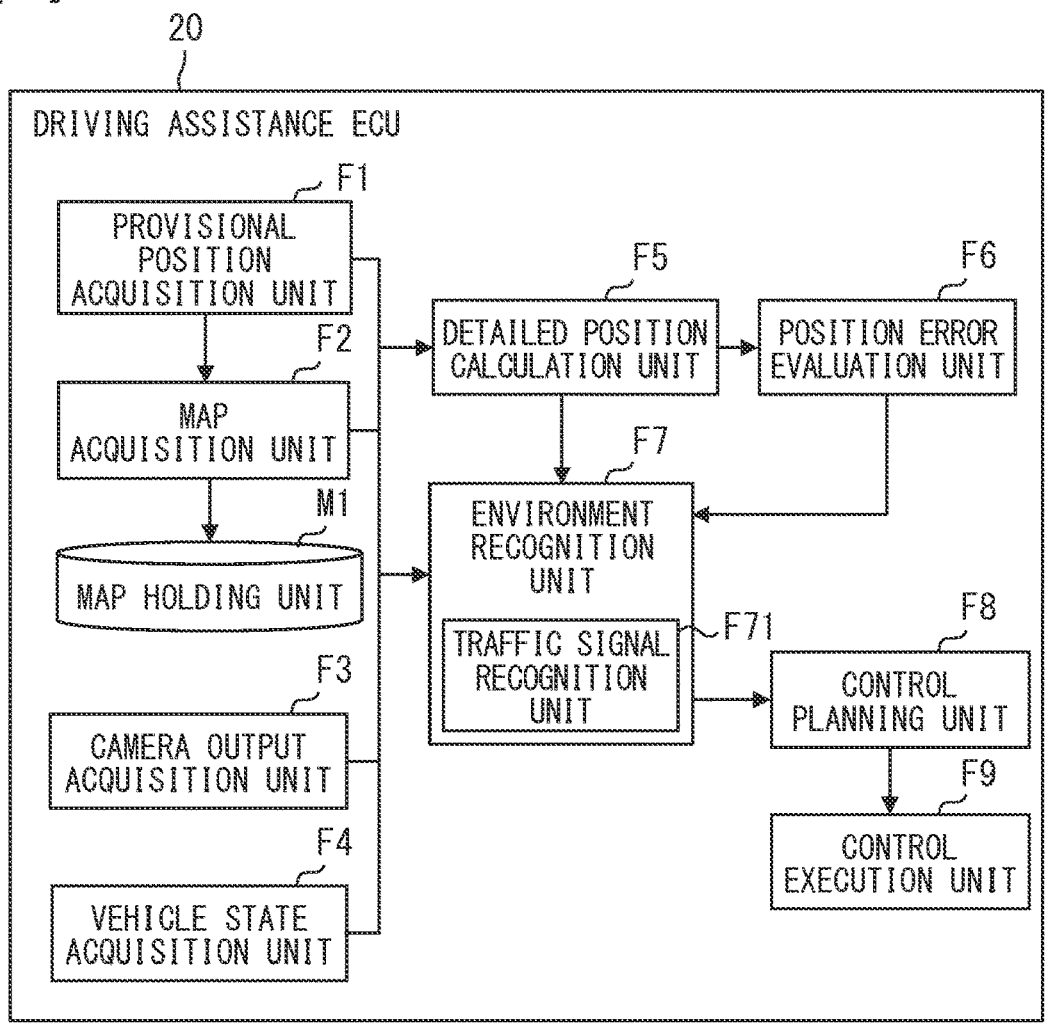
FIG. 4 is a block diagram illustrating a configuration of a driving assistance ECU.

Here, with reference to FIG. 4, a function and an action of the driving assistance ECU 20 will be described. The driving assistance ECU 20 provides functions corresponding to various functional blocks illustrated in FIG. 4, by the processing unit 21 executing a driving assistance program stored in the storage 23. That is, the driving assistance ECU 20 includes, as functional blocks, a provisional position acquisition unit F1, a map acquisition unit F2, a camera output acquisition unit F3, a vehicle state acquisition unit F4, a detailed position calculation unit F5, a position error evaluation unit F6, an environment recognition unit F7, a control planning unit F8, and a control execution unit F9.

The provisional position acquisition unit F1 acquires position information of the own vehicle from the locator 13. The provisional position acquisition unit F1 performs dead reckoning on the basis of an output of a yaw rate sensor or the like, by using, as a starting point, a position calculated by the detailed position calculation unit F5 to be described later. The provisional position acquisition unit F1 may have a function of the locator 13.

The map acquisition unit F2 wirelessly communicates with the map server 3 via the V2X in-vehicle device 14, to acquire map data corresponding to a current position of the own vehicle. For example, the map acquisition unit F2 requests and acquires, from the map server 3, partial map data related to a road through which the own vehicle is scheduled to pass within a predetermined time. The partial map data acquired from the map server 3 is stored in, for example, a map holding unit M1. The map holding unit M1 is realized by using, for example, a part of a storage area included in the storage 23 or the RAM 22. The map holding unit M1 is realized by using a non-transitory storage medium having substance.

As the current position used at the time of acquiring the map, a current position specified by the provisional position acquisition unit F1 or the detailed position calculation unit F5 can be adopted. For example, in a case where the detailed position calculation unit F5 has calculated the current position, the map data is acquired using the position information. Whereas, in a case where the detailed position calculation unit F5 has not calculated the current position yet, the map data is acquired using position coordinates acquired by the provisional position acquisition unit. As described above, the map data includes an installation position of a traffic signal. Thus, the map acquisition unit F2 corresponds to a configuration that acquires an on-map traffic signal position which is position coordinates of a traffic signal registered on the map, that is, corresponds to an on-map position acquisition unit.

The vehicle control system 1 may include an in-vehicle storage device that stores map data. In this case, the map acquisition unit F2 can be configured to sequentially read map data of surroundings of the current position from the in-vehicle storage device. That is, the map data acquired by the map acquisition unit F2 may be locally stored in the own vehicle or may be stored on a cloud.

The camera output acquisition unit F3 acquires a recognition result of the front camera 11 for a lighting device, other mobile body, a landmark, a road edge, a lane division line, and the like. For example, the camera output acquisition unit F3 acquires a recognition result of a lighting device including a correct answer probability value for each position and type. Specifically, the position and the traffic signal probability P of the lighting device detected by the front camera 11 are acquired as the recognition result of the lighting device. The observed lighting position, which is a detected position of the lighting device acquired by the camera output acquisition unit F3, corresponds to an observed traffic signal position which is a position of the traffic signal observed by the front camera 11. The camera output acquisition unit F3 corresponds to an observed position acquisition unit.

The camera output acquisition unit F3 acquires a position, a moving speed, a type, a size, and the like of other mobile body. Other mobile bodies include an automobile as other vehicle, a pedestrian, a bicycle, and the like. Moreover, the camera output acquisition unit F3 acquires a relative position, a type, and the like of the landmark from the front camera 11.

The camera output acquisition unit F3 converts relative position coordinates of the landmark acquired from the camera ECU 41 into position coordinates (hereinafter, also described as observation coordinates) in the global coordinate system. The observation coordinates of the landmark are calculated, for example, by combining current position coordinates of the own vehicle and relative position information of a feature with respect to the own vehicle. The camera ECU 41 may calculate the observation coordinates of the landmark by using the current position coordinates of the own vehicle. Similarly to the landmark, the camera output acquisition unit F3 may convert relative position information such as a lane marking into the position coordinates in the global coordinate system. The data acquired by the camera output acquisition unit F3 is provided to the environment recognition unit F7.

The vehicle state acquisition unit F4 acquires a traveling speed, a traveling direction, time information, weather, an illuminance outside the vehicle compartment, an operation speed of a wiper, and the like from the vehicle state sensor 12 and the like via the in-vehicle network Nw.

The detailed position calculation unit F5 executes localization processing based on traveling path information and landmark information acquired by the camera output acquisition unit F3. The localization processing refers to processing of specifying a detailed position of the own vehicle by collating a position of the landmark or the like specified on the basis an image captured by the front camera 11 with position coordinates of a feature registered in the high-precision map data. The localization processing may include at least one of, for example, longitudinal position estimation processing of estimating a position in a longitudinal direction by using a landmark such as a destination signboard, or lateral position estimation processing of estimating a position in a lateral direction of a road by using observation coordinates such as a lane division line and a road edge.

As the longitudinal position estimation processing, the detailed position calculation unit F5 associates a landmark registered on the map with a landmark observed by the front camera 11 on the basis of the observation coordinates of the landmark. For example, among landmarks registered on the map, a landmark closest to the observation coordinates of the landmark is estimated as the same landmark. In collation of the landmark, it is preferable to use a feature amount such as a shape, a size, or a color, for example, and to adopt a landmark having a higher degree of matching of the feature. When the association between the observed landmark and the landmark on the map is completed, a position deviated in the longitudinal direction from the position of the landmark on the map corresponding to the observed landmark by a distance between the observed landmark and the own vehicle is set as a longitudinal position of the own vehicle on the map.

For example, in a situation where a distance to a destination signboard present in front of the own vehicle is specified as 40 m as a result of the image recognition, it is determined that the own vehicle is present at a position deviated rearward of the vehicle by 40 m from position coordinates of the destination signboard registered in the map data. The longitudinal position estimation corresponds to processing of specifying the own vehicle position in the road extension direction. The longitudinal position estimation can also be referred to as longitudinal localization processing. By performing such longitudinal position estimation, a detailed remaining distance to a feature point on a road, such as an intersection, a curve entrance/exit, a tunnel entrance/exit, and the end of traffic jam is specified. The feature point on the road can be rephrased as a POI.

Note that, when a plurality of landmarks (for example, destination signboards) are detected in front of the own vehicle, the detailed position calculation unit F5 performs the longitudinal position estimation by using a landmark closest to the own vehicle among the plurality of landmarks. Recognition accuracy of a type and a distance of an object based on an image or the like becomes higher when the object is closer to the own vehicle. That is, in a case where a plurality of landmarks are detected, according to a configuration in which the longitudinal position estimation is performed using a landmark closest to the vehicle, the position estimation accuracy can be improved.

As a more preferable mode, the detailed position calculation unit F5 of the present embodiment is configured to execute the longitudinal position estimation processing by using, for example, a landmark present within a predetermined reference distance, in order to ensure position calculation accuracy. The reference distance can be, for example, 40 m. The reference distance may also be 30 m or 50 m. In a case where the front camera 11 includes a telephotographic camera, the reference distance may also be 100 m or the like. The reference distance may be set on the basis of performance and specifications such as a recognizable distance and an angle of view of the front camera 11.

As the lateral position estimation processing, the detailed position calculation unit F5 specifies a lateral position of the own vehicle with respect to the road, on the basis of distances from left and right road edges/lane markings recognized by the front camera 11. For example, when the distance from the left road edge to the vehicle center is specified as 1.75 m as a result of the image analysis, it is determined that the own vehicle is present at a position deviated 1.75 m to the right from coordinates of the left road edge. The lateral position estimation can also be referred to as lateral localization processing. The detailed position calculation unit F5 may specify a traveling lane ID, which is an identifier of a lane on which the own vehicle is traveling, on the basis of the distances from the left and right road edges/lane markings recognized by the front camera 11. The travel lane ID indicates, for example, which lane among lanes from the left or right road edge, on which the own vehicle is traveling. The detailed position calculation unit F5 may specify a detailed position of the own vehicle in the traveling lane, for example, an offset amount in the left-right direction from a center of the lane, on the basis of the distance from the left and right lane markings recognized by the front camera 11.

The own vehicle position as a result of the localization processing may simply be expressed by a coordinate system similar to the map data, for example, latitude, longitude, and altitude. Own vehicle position information can be expressed by any absolute coordinate system such as the World Geodetic System 1984 (WGS84).

As an example, the detailed position calculation unit F5 of the present embodiment is configured to perform the localization processing using a traffic signal present within a reference distance as the landmark in the daytime, and not to use a traffic signal as the landmark at night. That is, at night, the localization processing is performed using a landmark other than a traffic signal. This is because visibility of a housing of the traffic signal is poor at night, and reliability of whether or not to be a traffic signal, in other words, the recognition accuracy is deteriorated as compared with the daytime. As a matter of course, as another mode, the detailed position calculation unit F5 may be configured to use a traffic signal as the landmark of the localization processing even at night. As the landmark other than a traffic signal, for example, a road surface marking such as a temporary stop line or a crosswalk, a guide sign, or the like can be employed. A lane marking and a road edge can be used for the lateral position estimation processing regardless of day or night. Therefore, the lateral localization processing at night can be performed using features similar to those in the daytime.

The detailed position calculation unit F5 sequentially performs the localization processing in a predetermined position estimation cycle. A default value of the position estimation cycle may be 200 milliseconds or 400 milliseconds. For example, as long as the landmark has been recognized (in other words, captured), the detailed position calculation unit F5 sequentially performs the longitudinal position estimation processing in the above-described position estimation cycle. Even in a case where the landmark has not been recognized, the detailed position calculation unit F5 sequentially performs the lateral position estimation processing in the position estimation cycle as long as at least one of a lane marking or a road edge has been recognized (in other words, captured). At least one of the detailed position calculation unit F5 or the provisional position acquisition unit F1 corresponds to a vehicle position acquisition unit. The own vehicle position information calculated by the detailed position calculation unit F5 is provided to the provisional position acquisition unit F1, the position error evaluation unit F6, the environment recognition unit F7, and the like.

Every time the detailed position calculation unit F5 executes the localization processing, the position error evaluation unit F6 calculates an error evaluation value $\rho$, which is a difference between a current position outputted as a result of the localization processing performed this time and a position calculated by the provisional position acquisition unit F1 through dead reckoning or the like. For example, the position error evaluation unit F6 calculates, as the error evaluation value $\rho$, a difference between the own vehicle position coordinates calculated by the provisional position acquisition unit F1 and the result of the localization processing, when the localization processing is performed using a landmark different from the landmark used last time. As long as the localization processing has been sequentially performed, the result of the localization processing at the previous time is reflected in provisional position information calculated by the provisional position acquisition unit F1, and thus the error evaluation value ρ is a sufficiently small value. For example, as long as the localization processing has been sequentially performed, the error evaluation value ρ is suppressed to less than 0.5 m.

The error evaluation value ρ tends to be larger when a period in which the localization cannot be performed becomes longer. In the period in which the localization processing cannot be executed, a provisional error evaluation value ρ is calculated by multiplying a predetermined error estimation coefficient by an elapsed time or a travel distance from a time point when the localization processing can be executed last. The position error evaluation unit F6 corresponds to a configuration that calculates the error evaluation value ρ in accordance with an elapsed time since the localization is performed last, and in accordance with a degree of deviation between the own vehicle position coordinates obtained by the localization processing and the own vehicle position coordinates estimated by a method other than localization. The method other than localization refers to positioning by GNSS, dead reckoning using an inertial sensor, and the like. The error evaluation value ρ calculated by the position error evaluation unit F6 is provided to the environment recognition unit F7. The position error evaluation unit F6 may be present inside the detailed position calculation unit F5. The position error evaluation unit F6 corresponds to a position error acquisition unit. Since the error evaluation value ρ is a parameter indicating a degree of an error of a vehicle position acquired by the provisional position acquisition unit F1, the error evaluation value ρ can also be referred to as a vehicle position error.

The environment recognition unit F7 recognizes a surrounding environment which is an environment around the own vehicle, on the basis of a recognition result or the like by the front camera 11 acquired by the camera output acquisition unit F3. Here, the surrounding environment includes a current position of the own vehicle, and a travel lane, a road type, a speed limit, and a relative position of a traffic signal and the like. The surrounding environment can include a position and a moving speed of other mobile body, a shape and a size of a surrounding object, and the like. The environment recognition unit F7 includes a traffic signal recognition unit F71 as a sub-function.

The traffic signal recognition unit F71 is a configuration that determines whether or not a lighting device detected by the front camera 11 is a traffic signal, by using map data. The traffic signal recognition unit F71 can include a function of not only determining whether a lighting device detected by the front camera 11 is a traffic signal, but also recognizing a lighting state when determining that the lighting device is a traffic signal. Details of the traffic signal recognition unit F71 will be separately described later.

The environment recognition unit F7 may recognize a position and a type of an object present around the own vehicle, by acquiring detection results individually from a plurality of peripheral monitoring sensors and combining the detection results. In addition, the environment recognition unit F7 may specify the surrounding environment by using other vehicle information received by the V2X in-vehicle device 14 from other vehicles, traffic information received from a roadside device through road-to-vehicle communication, and the like. The traffic information that can be acquired from a roadside device can include road construction information, traffic regulation information, traffic jam information, weather information, a speed limit, and the like.

The control planning unit F8 generates a vehicle control plan for assisting a driving operation of the user, by using the travel environment recognized by the environment recognition unit F7 and the map data. For example, when it is confirmed that there is a traffic signal in front of the own vehicle, the control planning unit F8 creates a vehicle control plan according to a lighting state of the traffic signal. For example, when the traffic signal at a time point when the own vehicle arrives 100 m before the traffic signal is red, a travel plan for decelerating to stop before the traffic signal by a predetermined distance is created. A stop position may be a position of a temporary stop line indicated in the map data. When there is a preceding vehicle, the control plan may be updated as needed so as to stop behind the preceding vehicle by a predetermined distance. When the traffic signal is in a lighting state in which entry and passage of the own vehicle into and through the intersection are permitted, a control plan for passing through the intersection is established. The lighting state in which entry and passage to and through the intersection are permitted is a case where an arrow signal or blue is lit.

The content of the control plan prepared for the traffic signal may simply be generated on the basis of a prediction result of the lighting state of the traffic signal at a time point when the own vehicle arrives a predetermined distance (for example, 100 m or 50 m) before the traffic signal. For convenience, vehicle control for assisting traveling when passing through a road provided with a traffic signal is referred to as traffic signal passage assistance. The traffic signal passage assistance includes brake control for stopping before the traffic signal. The traffic signal passage assistance may also be a process of notifying the user of the presence of the traffic signal and the lighting state of the traffic signal in cooperation with the HMI system 15. The control plan of the traffic signal passage assistance may be generated and corrected on the basis of not only a lighting state of a traffic signal for vehicles but also a lighting state of a traffic signal for pedestrians. The control plan of the traffic signal passage assistance may be updated as needed on the basis of a change in the lighting state of the traffic signal.

In addition, the control planning unit F8 may generate a control plan including a control schedule of a steering amount for traveling in a center of a recognized travel lane, or may generate, as a travel plan, a route along a behavior or a traveling trajectory of a recognized preceding vehicle. When a traveling path of the own vehicle corresponds to a road having a plurality of lanes on each side, the control planning unit F8 may generate a plan candidate for lane change to an adjacent lane in a direction same as the traveling lane of the own vehicle. When it is confirmed that an obstacle is present in front of the own vehicle on the basis of a detection result of the front camera 11 or the map data, the control planning unit F8 may generate a travel plan for passing by a side of the obstacle. The travel plan may include acceleration/deceleration schedule information for speed adjustment on the calculated route. The control planning unit F8 may also be configured to cause the own vehicle to autonomously travel.

The control execution unit F9 is a configuration that outputs a control signal corresponding to the control plan determined by the control planning unit F8, to the travel actuator 16 and/or the HCU 152 that is to be a control target. For example, when deceleration is scheduled, a control signal for realizing planned deceleration with respect to the brake actuator or the electronic throttle is outputted. A control signal for outputting an image and sound indicating an execution state of the traffic signal passage assistance is outputted to the HCU 152.

<Operation Flow of Driving Assistance ECU 20>

Figure 5:
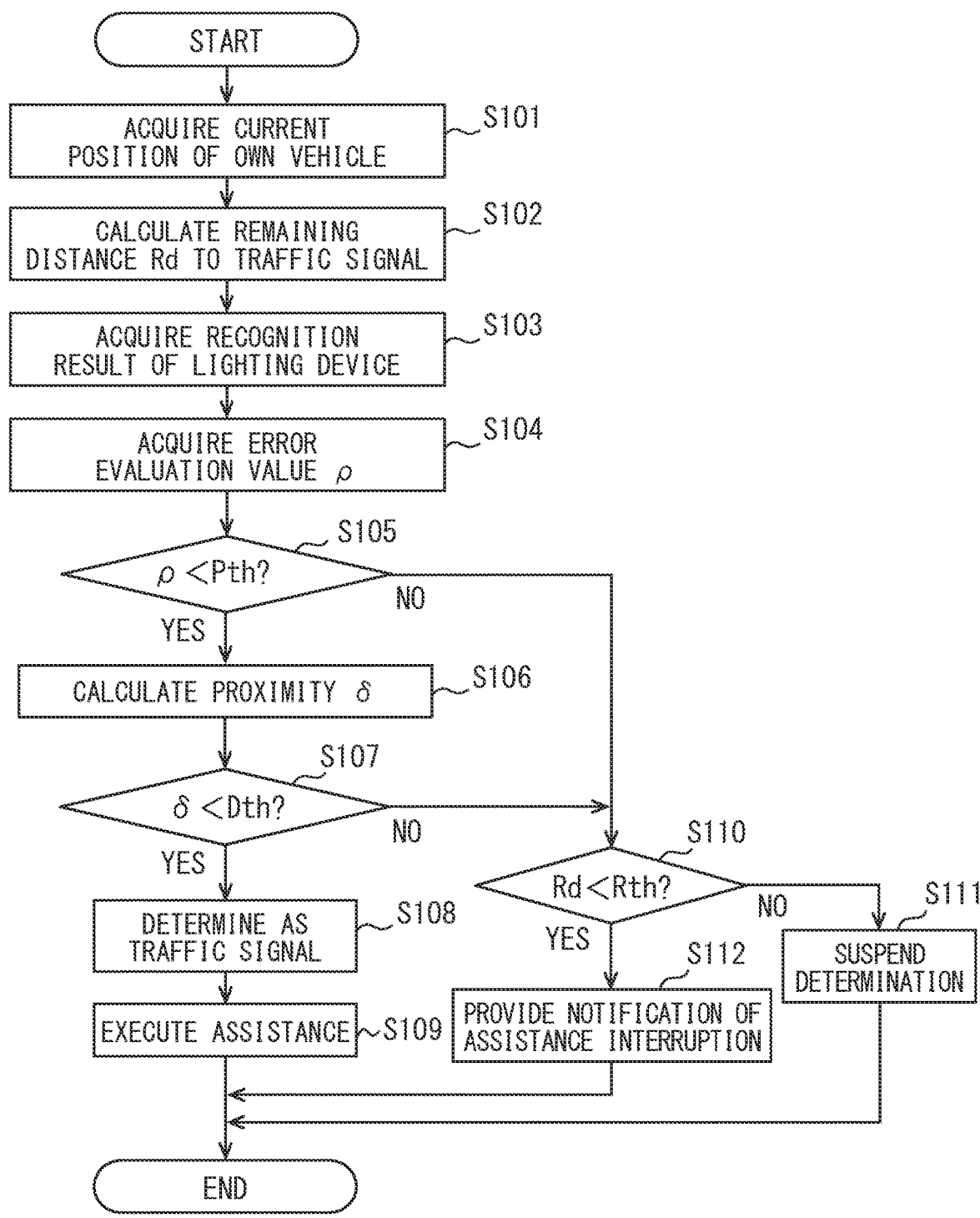
FIG. 5 is a flowchart of traffic signal passage assistance processing executed by the driving assistance ECU.

Next, with reference to a flowchart illustrated in FIG. 5, traffic signal passage assistance processing executed by the driving assistance ECU 20 will be described. The flowchart illustrated in FIG. 5 is executed at a predetermined cycle (for example, every 200 milliseconds), for example, while a traveling power source of the vehicle is on. The traveling power source is, for example, an ignition power source in an engine vehicle. In an electric vehicle, a system main relay corresponds to the traveling power source. In the present embodiment, as an example, the traffic signal passage assistance processing includes steps S101 to S112.

The detailed position calculation unit F5 sequentially performs the localization processing independently of the flowchart illustrated in FIG. 5, in other words, in parallel, in the driving assistance ECU 20. Specifically, the detailed position calculation unit F5 sequentially performs the longitudinal position estimation processing by using a landmark other than a traffic signal. A lateral position is sequentially calculated on the basis of at least one of a lane marking or a road edge. In a case where a landmark other than a traffic signal has not been recognized, a longitudinal position may simply be estimated on the basis of, for example, a vehicle speed or a wheel speed. By executing the localization processing, a detailed position of the own vehicle on the map is determined.

First, in step S101, at least one of the detailed position calculation unit F5 or the provisional position acquisition unit F1 calculates or acquires a current position of the own vehicle, and the processing proceeds to step S102. Step S101 corresponds to a vehicle position acquisition step.

In step S102, the environment recognition unit F7 refers to map data acquired by the map acquisition unit F2, specifies a position of a front traffic signal, and calculates a remaining distance Rd, which is a distance from the own vehicle to the front traffic signal, and the processing proceeds to step S103. Among traffic signals registered in the map data, the front traffic signal refers to a traffic signal closest to the own vehicle among traffic signals that are for the own vehicle and are present in front of the own vehicle. The traffic signals for the own vehicle are traffic signals that should be seen by the own vehicle, in other words, traffic signals that should be followed by the own vehicle. A traffic signal for oncoming vehicles and a traffic signal for intersecting vehicles do not correspond to the front traffic signal. The intersecting vehicle refers to a vehicle traveling on another road connected to the road on which the own vehicle is traveling. For example, a vehicle coming from a side at an intersection corresponds to the intersecting vehicle.

As a result of referring to the map data in step S102, in a case where it is confirmed that there is no traffic signal within a predetermined distance (for example, 250 m) in front of the own vehicle, the subsequent processing may be omitted and this flow may be ended. At the end of this flow, the processing is executed again from step S101 after a predetermined time such as 200 milliseconds. Step S102 corresponds to an on-map position acquisition step.

In step S103, the camera output acquisition unit F3 acquires a recognition result of a lighting device that may be a traffic signal from the front camera 11, and the processing proceeds to step S104. Step S103 corresponds to an observed position acquisition step. The lighting device that may be a traffic signal can be, for example, a lighting device whose traffic signal probability P is equal to or larger than a predetermined candidate threshold. The candidate threshold is a threshold for separating an object that may be a traffic signal and an object that is not a traffic signal, and a specific value can be changed as appropriate. The candidate threshold can be, for example, 40%. The candidate threshold may also be 50%, 75%, or the like. In a case where the lighting device that may be a traffic signal is not detected in step S103, the processing proceeds to step S110.

In step S104, the traffic signal recognition unit F71 acquires the error evaluation value $\rho$ calculated in the above-described mode from the position error evaluation unit F6, and the processing proceeds to step S105. In step S105, the traffic signal recognition unit F71 determines whether or not the error evaluation value $\rho$ acquired in step S104 is less than a predetermined error threshold Pth. The error threshold Pth can be, for example, 0.5 m or 1 m. By setting the error threshold Pth to less than 1 m, it is possible to reduce a possibility of crossing over a temporary stop line at the time of signal stop. When the error evaluation value $\rho$ is less than the error threshold Pth, an affirmative determination is made in step S105, and the processing proceeds to step S106. Whereas, when the error evaluation value $\rho$ is equal to or larger than the error threshold Pth, a negative determination is made in step S105, and the processing proceeds to step S110.

In step S106, the traffic signal recognition unit F71 calculates a proximity $\delta$, which is a difference (in other words, a distance) between a position of the front traffic signal indicated in the map data and a position of the lighting device recognized by the front camera 11 acquired in step S102, and the processing proceeds to step S107. The proximity $\delta$ can be a linear distance in a three-dimensional space. The proximity $\delta$ may also be a distance in the lateral direction. The proximity $\delta$ may be calculated for each of a distance in the lateral direction and a distance in the up-down direction.

In step S107, the traffic signal recognition unit F71 determines whether or not the proximity $\delta$ calculated in step S106 is less than a predetermined deemed threshold Dth. The deemed threshold Dth is a threshold for determining whether or not a traffic signal candidate, which is the lighting device having a possibility of being a traffic signal extracted in step S103, is truly a traffic signal. The deemed threshold Dth can be, for example, 1.0 m. The deemed threshold Dth can be the same as the error threshold Pth or a value larger than the error threshold Pth by a predetermined amount. The deemed threshold Dth may also be 0.5 m, 1.5 m, or the like. In a case where the proximity $\delta$ is less than the deemed threshold Dth, an affirmative determination is made in step S107, and the processing proceeds to step S108. Whereas, when the proximity $\delta$ is equal to or larger than the deemed threshold Dth, a negative determination is made in step S107, and the processing proceeds to step S110. Step S107 corresponds to a traffic signal recognition step.

In step S108, the traffic signal recognition unit F71 determines that the traffic signal candidate extracted in step S102 is a traffic signal, and the processing proceeds to step S109. Note that, if a plurality of traffic signal candidates are extracted in step S102, the proximity $\delta$ for each of the plurality of traffic signal candidates is calculated in step S106. Then, in step S108, it is sufficient to determine whether or not the proximity $\delta$ is less than the deemed threshold Dth for the smallest proximity $\delta$ among the plurality of traffic signal candidates. Among the plurality of traffic signal candidates, the traffic signal recognition unit F71 can determine, as the traffic signal, a traffic signal having the smallest proximity δ and having the proximity δ less than the deemed threshold Dth. The traffic signal recognition unit F71 may obtain a score of likelihood as a traffic signal on the basis of both the proximity δ and the traffic signal probability P outputted from the front camera 11, and determine whether or not to be a traffic signal on the basis of the score.

In step S109, the control planning unit F8 plans, as the traffic signal passage assistance, vehicle control according to the remaining distance Rd to the front traffic signal and a lighting state of the front traffic signal recognized by the front camera 11, and the control execution unit F9 executes control according to the control plan.

In step S110, it is determined whether or not the remaining distance Rd is less than a predetermined assistance stop distance Rth. The assistance stop distance Rth is a threshold for giving up execution of the traffic signal passage assistance. The assistance stop distance Rth corresponds to a first predetermined distance. The assistance stop distance can also be referred to as a limit distance. The assistance stop distance Rth can be, for example, 50 m. The assistance stop distance Rth may also be 100 m, 70 m, 40 m, or the like. When the lighting state of the traffic signal is red, the assistance stop distance Rth is set to a distance at which the own vehicle can stop at predetermined deceleration before the own vehicle reaches a temporary stop line arranged in front of the traffic signal. The deceleration assumed here is, for example, 0.3 G≈3 m/sec^2.

The assistance stop distance Rth may be dynamically determined in accordance with a traveling speed of the own vehicle acquired by the vehicle state acquisition unit F4. When the traveling speed is faster, the assistance stop distance Rth is set to be longer. In other words, when the traveling speed is smaller than a predetermined value, the assistance stop distance Rth can be set to a value shorter than the predetermined default value. The assistance stop distance Rth may be defined by time. For example, the assistance stop distance Rth may be dynamically determined as a distance corresponding to six seconds. In a case where the remaining distance Rd is less than the assistance stop distance Rth, an affirmative determination is made in step S110, and the processing proceeds to step S112. Whereas, when the remaining distance Rd is equal to or longer than the assistance stop distance Rth, a negative determination is made in step S110, and the processing proceeds to step S111.

In step S111, the determination as to whether or not the traffic signal candidate is a traffic signal is suspended, and this flow ends. In other words, this step corresponds to a step of suspending the determination as to whether or not to interrupt the traffic signal passage assistance. In a case where the determination is suspended and this flow ends, the processing is executed again from step S101 after a predetermined time, for example after 200 milliseconds or the like.

In step S112, the control planning unit F8 determines to interrupt the traffic signal passage assistance for the front traffic signal. The control execution unit F9 cooperates with the HMI system 15 to execute processing for notifying the user that the traffic signal passage assistance is not performed, and ends this flow. For example, in step S112, an instruction signal for displaying a text message or an icon image indicating that the traffic signal passage assistance is not performed on the display 151 is outputted to the HCU 152 and displayed. In step S112, a voice message indicating that the traffic signal passage assistance is not performed may be outputted from the speaker. An icon image indicating that the traffic signal passage assistance is not performed may be displayed on the display 151. In addition, the content notification of which is provided in step S112 may be a fact that the traffic signal has not been recognized. The content notification of which is provided in step S112 can be various types of information regarding a recognition state of the traffic signal. In step S112, an error signal indicating that detection of the traffic signal has failed may be uploaded to the map server 3 via the V2X in-vehicle device 14. According to this configuration, the map server 3 can specify a point and a time zone where a traffic signal is difficult to recognize. The error signal preferably includes a current position, identification information of a front traffic signal, model information of the front camera 11, and the like.

In the above configuration, the proximity δ is used as a material for determining whether the detected lighting device is a traffic signal. According to this configuration, consistency between position information registered in the map and an observation result is considered, so that determination accuracy can be enhanced even when it is difficult to determine whether the detected lighting device is a traffic signal only with the feature amount of the image. Even when a plurality of lighting devices are detected, it is possible to specify a lighting device corresponding to a traffic signal, by comparing the proximity δ of each lighting device. For example, the lighting device having the smallest proximity δ can be determined to be lighting of a traffic signal.

The case where it is difficult to determine whether the detected lighting device is a traffic signal includes, for example, a case where a housing of the traffic signal is assimilated with a background at night. The case of assimilation with the background includes, in other words, a state in which a contour portion of the housing does not have a luminance difference that can be subjected to edge detection with respect to the background. A case where an amount of image information for recognition as a traffic signal is small due to rainfall, backlight, or the like is also included in a case where it is difficult to determine whether the detected lighting device is a traffic signal. The information for recognizing as a traffic signal is an outline shape of a housing or the like, color information, and the like. At a time of rainfall, a shape of an object in an image is distorted by raindrops attached to a windshield or a lens present in front of the camera, and thus, a feature amount for recognizing a traffic signal as a traffic signal may decrease. Also at a time of backlight, for example, an edge portion indicating a detailed configuration in the housing, such as the number of lighting portions, becomes unclear or color information decreases, so that a feature amount for recognizing a traffic signal as a traffic signal may decrease. In addition, the configuration of the present disclosure can improve determination accuracy as to whether the detected lighting device is a traffic signal in various scenes such as when traveling on a curve.

The traffic signal recognition unit F71 of the present disclosure performs the traffic signal determination using the proximity δ on condition that the error evaluation value ρ is less than the error threshold Pth. According to this configuration, a risk of erroneous determination of a traffic signal can be further reduced. As in the above configuration, according to the configuration of determining whether the detected lighting device is a traffic signal by using the proximity δ, it is possible to reduce a risk that an image of a traffic signal reflected on a window glass of a building or the like is erroneously determined as an actual traffic signal. This is because it can be expected that the image of the traffic signal reflected on a window glass or the like of a building due to reflection of light is greatly away from an installation position of the traffic signal. In addition, the installation position of the traffic signal is registered on the PD map on the basis of probe data uploaded from vehicles. Therefore, the installation position of the traffic signal registered on the PD map may include a certain degree of error. In view of such circumstances, by providing the error threshold Pth with a certain range, it is possible to reduce a possibility of erroneously determining that a traffic signal is not a traffic signal.

In the configuration disclosed in Patent Literature 1 and the like, there is a concern that a traffic signal for intersecting vehicles may be erroneously recognized as a traffic signal for the own vehicle in accordance with turning of a vehicle body when turning right or left at an intersection. Regarding such a concern, according to the configuration of the present disclosure, a traffic signal that should be seen by the own vehicle is extracted from the map, and the traffic signal is recognized on the basis of the proximity δ to the traffic signal. Of course, it is assumed that the traffic signal for intersecting vehicles is sufficiently distant from the traffic signal that should be seen by the own vehicle, for example, 5 m or more. Therefore, according to the configuration of the present disclosure, it is possible to reduce a possibility that a traffic signal for intersecting vehicles is erroneously recognized as a traffic signal for the own vehicle, and an unexpected operation such as stopping in an intersection is performed.

The processing of determining whether the detected lighting device is a traffic signal by using the proximity δ may be omitted when a lighting device having a sufficiently high possibility of being a traffic signal is detected. For example, when a lighting device having the traffic signal probability P of a predetermined value (for example, 95%) or more is detected, the determination processing using the proximity δ may be omitted. According to this configuration, a processing load on the processing unit 21 can be reduced. This configuration corresponds to a configuration in which a lighting device is regarded as a traffic signal when a lighting device having the traffic signal probability P of the predetermined value or more is detected, while a lighting device corresponding to a traffic signal is searched for on the basis of the proximity δ when a lighting device having the traffic signal probability P of the predetermined value or more is not detected. In addition, in order to prevent a traffic signal for intersecting vehicles from being erroneously recognized as the traffic signal for the own vehicle, the recognition processing on the lighting state of the traffic signal may be canceled in a state where a yaw rate is equal to or larger than a predetermined threshold in an intersection. The traffic signal recognition unit F71 may be configured to recognize a traffic signal for intersecting vehicles or a traffic signal for oncoming vehicles separately from a front traffic signal. The determination processing using the proximity δ can also be applied when a traffic signal for intersecting vehicles or a traffic signal for oncoming vehicles is recognized. The traffic signal for intersecting vehicles or the traffic signal for oncoming vehicles can be referred to as a traffic signal for other vehicle.

Although the embodiment of the present disclosure has been described above, the present disclosure is not limited to the above-described embodiment, various configurations described below are also included in the technical scope of the present disclosure, and various modifications other than those described below can be made without departing from the scope of the present disclosure. For example, the following various configurations can be appropriately combined and implemented as long as no technical contradiction occurs. Members having the same functions as those of the members described in the above embodiment are denoted by the same reference numerals, and the description thereof will be omitted. In a case where only a part of a configuration is mentioned, the configuration of the embodiment described above can be applied to other parts.

<Regarding Advance Notice of Interruption of Assistance>

The driving assistance ECU 20 may be configured to perform, before determining and providing notification that the traffic signal passage assistance is to be canceled, cancel advance notice processing which is processing for giving an advance notice to the user that there is a possibility of canceling the traffic signal passage assistance. For example, a lighting device corresponding to a front traffic signal has not been specified yet at a time point when the remaining distance Rd becomes less than a cancel advance notice distance Rn, the driving assistance ECU 20 may output a message indicating that there is a possibility of canceling the traffic signal passage assistance. The cancel advance notice distance Rn is set within a range larger than the assistance stop distance Rth. The cancel advance notice distance corresponds to a second predetermined distance. For example, the cancel advance notice distance Rn can be 70 m or 100 m. The cancel advance notice distance Rn can be a value obtained by adding a predetermined margin such as 20 m or 30 m to the assistance stop distance Rth. The cancel advance notice distance Rn and the margin may be dynamically determined according to a traveling speed of the own vehicle acquired by the vehicle state acquisition unit F4. For example, the margin may be dynamically determined as a distance corresponding to four seconds. The message outputted as cancel advance notice processing may be an image message or a voice message. A predetermined icon image indicating that there is a possibility of canceling the traffic signal passage assistance may be displayed on the display 151.

Figure 6:
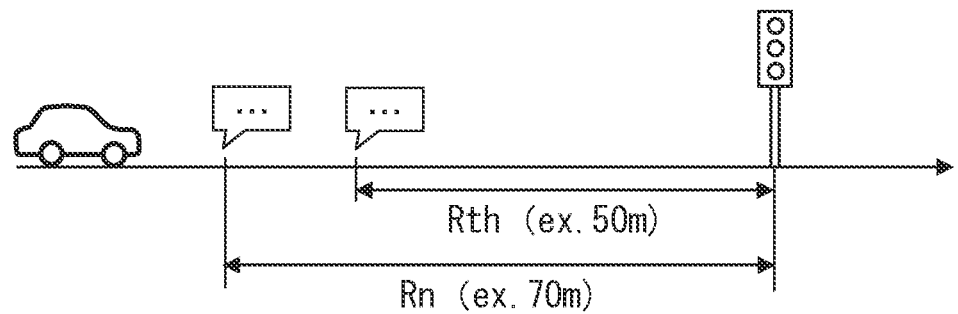
FIG. 6 is a view for explaining an operation of the driving assistance ECU.

In such a configuration, when the traffic signal passage assistance is finally canceled, as illustrated in FIG. 6, the driving assistance ECU 20 gives an advance notice to the user that there is a possibility of canceling the traffic signal passage assistance when the vehicle passes through a point where the remaining distance Rd becomes the cancel advance notice distance Rn. Then, the driving assistance ECU 20 notifies the user that the traffic signal passage assistance is canceled when the vehicle passes through a point where the remaining distance Rd becomes the assistance stop distance Rth. According to such a configuration, the user can know the possibility that the traffic signal passage assistance will be canceled in advance, in other words, at a stage where there is sufficient time. As a result, even when the traffic signal passage assistance is finally canceled, it is possible a reduce a risk of perturbing the user.

<Supplement to Deemed Threshold Dth>

Figure 7:
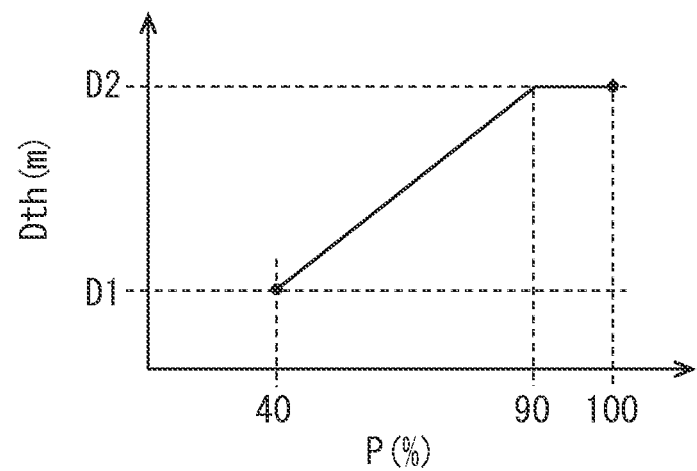
FIG. 7 is a graph illustrating an adjustment example of a deemed threshold.

The traffic signal recognition unit F71 may be configured to relax the deemed threshold Dth in accordance with the detected traffic signal probability P of the lighting device. That is, the traffic signal recognition unit F71 may be configured to set the deemed threshold Dth larger when the traffic signal probability P of the detected lighting device is larger. For example, as illustrated in FIG. 7, the deemed threshold Dth is set to a predetermined first distance D1 in a case where the traffic signal probability P is 40%, and the deemed threshold Dth is set to a predetermined second distance D2 in a case where the traffic signal probability P is 90% or more. In a case where the traffic signal probability P is less than 90%, the deemed threshold Dth is set larger when the traffic signal probability P is larger. The first distance D1 can be, for example, 0.5 m, 0.7 m or the like. The second distance D2 can be, for example, 2.0 m, 2.5 m, or the like.

According to such a configuration, it is possible to reduce a possibility of erroneously determining that a traffic signal is not a traffic signal due to a deviation of an on-map traffic signal position, which is an installation position of the traffic signal registered on the map, from an actual installation position. That is, it is possible to prevent a traffic signal from being undetectable when the on-map traffic signal position is wrong. According to this configuration, a degree of deviation between the on-map traffic signal position and an observed traffic signal position, which is a traffic signal position observed by the front camera 11, can be accurately evaluated. As described above, the installation positions of the traffic signals registered on the PD map include errors. In view of such circumstances, the above configuration is particularly suitable when the map data handled by the map server 3 is a PD map.

<Supplement to Traffic Signal Recognition Unit F71>

The above-described recognition method for a traffic signal can be similarly applied not only to recognition of a traffic signal for vehicles but also to recognition of a traffic signal for pedestrians. The traffic signal recognition unit F71 may be configured to detect a traffic signal for pedestrians. If a traffic signal for pedestrians can be detected, a movement of pedestrians can be easily predicted on the basis of a lighting state. That is, safety can be further enhanced by planning vehicle control when the vehicle passes through an intersection or the like, by using the lighting state of the traffic signal for pedestrians.

In a case where installation of both a traffic signal for vehicles and a traffic signal for pedestrians in one traveling direction has been successfully specified with reference to the map data, the traffic signal for vehicles and the traffic signal for pedestrians may be recognized as a set. On condition that a proximity of the traffic signal for vehicles is less than a predetermined threshold and a proximity of the traffic signal for pedestrians is also less than a predetermined threshold, these traffic signals may be determined as a traffic signal. According to this configuration, since the number of determination materials increases, it is possible to reduce a possibility of erroneously determining things other than a traffic signal as a traffic signal.

In addition, the traffic signal recognition unit F71 may supplementarily use a recognition result of a traffic signal for pedestrians to recognize a traffic signal for vehicles. For example, when a traffic signal for pedestrians has been recognized, a lighting device that emits light of a color corresponding to a lighting state of the traffic signal for pedestrians may be preferentially searched for. For example, when the traffic signal for pedestrians is blue, the traffic signal may be searched for from among blue lighting devices. Similarly, a detection result of a traffic signal for vehicles may be supplementarily used to identify a traffic signal for pedestrians. The recognition result of the traffic signal for vehicles and the recognition result of the traffic signal for pedestrians can be complementarily used.

A traffic signal for pedestrians is disposed relatively below a traffic signal for vehicles. Therefore, in the traffic signal for pedestrians, a housing portion is more easily detected by a headlight of a vehicle, a street light, or the like than the traffic signal for vehicles. Even in the daytime, a housing of the traffic signal for pedestrians is less likely to be assimilated with a background such as a cloud than the traffic signal for vehicles. Therefore, the traffic signal for pedestrians may be more easily detected than the traffic signal for vehicles as long as a field of view of the front camera 11 is not blocked by other vehicle, a building, or the like. In consideration of such circumstances, the recognition accuracy of a traffic signal for vehicles can be enhanced by complementarily using a recognition result of the traffic signal for pedestrians, for determining whether or not the detected lighting device is the traffic signal for vehicles.

Whereas, a traffic signal for vehicles is disposed relatively above a traffic signal for pedestrians. Therefore, the traffic signal for vehicles has a characteristic of being easier to detect from a distance than the traffic signal for pedestrians. In many cases, the traffic signal for pedestrians and the vehicle traffic signal are linked with each other. Therefore, it is also possible to use lighting state information of the traffic signal for vehicles to search for the traffic signal for pedestrians. For example, when the traffic signal for vehicles is blue, a blue light source may be preferentially searched as the traffic signal for pedestrians. According to the configuration in which the lighting state information of the traffic signal for vehicles is used to search for the traffic signal for pedestrians, it is possible to reduce a processing load for detecting the traffic signal for pedestrians and to improve detection accuracy. The map data preferably includes not only an installation position of a traffic signal for vehicles but also an installation position of a traffic signal for pedestrians. The map data preferably includes, as traffic signal data, data indicating whether or not a traffic signal for vehicles and a traffic signal for pedestrians having the same traveling direction are synchronized with each other, in other words, whether or not the traffic signal is a pedestrian-vehicle separated traffic signal.

When the traffic signal for pedestrians and the traffic signal for vehicles in the same direction are linked with each other, the traffic signal recognition unit F71 may estimate a lighting state of the traffic signal for vehicles based on a lighting state of the traffic signal for pedestrians. There is a case where a time difference of about several seconds to 10 seconds is provided at a change timing of a lighting state of the traffic signal for pedestrians and the traffic signal for vehicles. The traffic signal recognition unit F71 may predict a change in the lighting state of the traffic signal for vehicles from a change in the lighting state of the traffic signal for pedestrians, to create and correct the control plan.

In addition, when a lighting device corresponding to a front traffic signal has been successfully specified, the traffic signal recognition unit F71 tracks the lighting device as the front traffic signal by using a predetermined tracking method. Various methods can be employed as the tracking method of the lighting device. For example, the traffic signal recognition unit F71 estimates a position of the traffic signal at a current time on the basis of an observed position of the traffic signal and a moving speed of the own vehicle at a previous time, and regards a lighting device closest to the estimated position as the same traffic signal among the lighting devices included in a current image frame. For example, a traffic signal for which the proximity δ calculated at the previous time and the newly calculated proximity δ are within a predetermined threshold may be tracked as the same traffic signal. The traffic signal recognition unit F71 may track the lighting device corresponding to the traffic signal by using, for example, a degree of similarity of a feature amount such as a color histogram, a size, and a luminance.

In a configuration in which tracking is performed mainly using a similarity between an observed position and an estimated position based on an observed position at a previous time, the probability that the lighting device is a traffic signal may be increased on the basis of a fact that lighting color of the lighting device has changed in a predetermined pattern. Examples of the change pattern for increasing the probability that the detected lighting device is a traffic signal include a pattern of changing from blue to yellow or red, and a pattern of changing from red or yellow to blue. The change pattern for increasing the probability that the detected lighting device is a traffic signal can be appropriately changed so as to correspond to a change pattern of a traffic signal in an area where the driving assistance ECU 20 is used.

<Regarding Use for Map Update>

Figure 8:
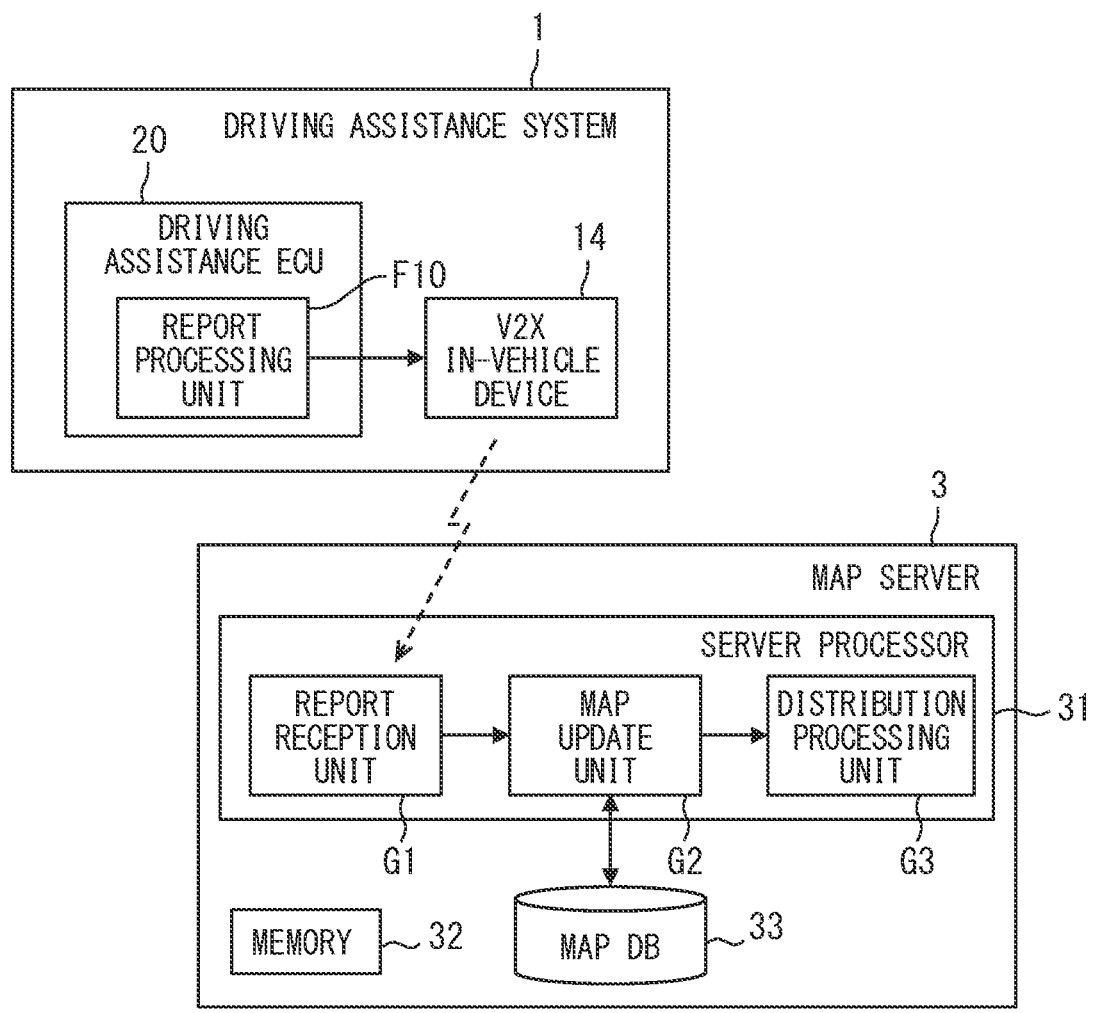
FIG. 8 is a diagram for explaining an interaction between the vehicle control system and a map server.

According to the above configuration, it is possible to calculate a deviation amount and a direction thereof between the on-map traffic signal position and the observed traffic signal position. As illustrated in FIG. 8, the driving assistance ECU 20 may include, as a functional unit, a report processing unit F10 that transmits a data set indicating a degree of deviation between the on-map traffic signal position and the observed traffic signal position, as probe data to the map server 3. In FIG. 8, illustration of the described configurations such as the environment recognition unit F7 and the like is omitted.

The probe data includes, for example, traffic signal identification information and traffic signal positional deviation information. The traffic signal identification information is information indicating a traffic signal to be reported, and can be, for example, an identification number of a traffic signal registered in map data. The traffic signal identification information may also be a data set indicating a name or a node number of an intersection and a traveling direction of the own vehicle. The traffic signal positional deviation information is information indicating a deviation amount and a direction thereof between the on-map traffic signal position and the observed traffic signal position, and preferably includes a deviation amount for each of latitude, longitude, and altitude. The traffic signal positional deviation information corresponds to data indirectly indicating the observed traffic signal position. The probe data may include data directly indicating the observed traffic signal position, that is, coordinate data of the observed traffic signal position, instead of or in parallel with the traffic signal positional deviation information. The probe data including the traffic signal positional deviation information and/or the coordinate data of the observed traffic signal position corresponds to observation result information. The observed traffic signal position used to generate the probe data may be calculated at a time point when the remaining distance Rd to the traffic signal becomes a predetermined distance such as 40 m, or may be a position calculated at a time point when a traffic signal is finally detected.

The probe data may include the error evaluation value $\rho$ at a time point when the traffic signal position or the traffic signal positional deviation information to be reported is calculated. By including the error evaluation value $\rho$ in the probe data, the map server 3 can evaluate the accuracy of the reported position information of the traffic signal. In addition, the probe data may include traveling trajectory information, traveling path information, and feature information. The traveling trajectory information is information indicating a trajectory on which the own vehicle has traveled. For example, the traveling trajectory information is expressed as a point sequence of the own vehicle position. The traveling path information is information indicating a trajectory of an end or a center line of the traveling path. An end or the like of the traveling path may also be expressed by a coordinate point group. The traveling trajectory information and the traveling path information may be expressed by a cubic spline curve. The traveling trajectory information and the traveling path information may be expressed by a coefficient parameter indicating a regression equation of a detection point. The regression equation is a function corresponding to a straight line or a curve approximately representing a distribution of a plurality of detection points, and is calculated by, for example, the least squares method or the like.

The transmission of the probe data by the report processing unit F10 is executed when a deviation amount of the traffic signal position equal to or larger than a predetermined threshold is detected. In addition, the transmission of the probe data by the report processing unit F10 may be periodically executed. Whether or not to transmit the probe data may be controlled on the basis of an instruction from the map server 3. The determination as to whether a detected lighting device is a traffic signal based on the proximity $\delta$ is performed on condition that the error evaluation value $\rho$ is less than the error threshold Pth as one mode of implementation. That is, the above configuration corresponds to a configuration in which the probe data for updating position information of a traffic signal is uploaded to the map server 3 on condition that the error evaluation value $\rho$ is less than the error threshold Pth.

As illustrated in FIG. 8, the map server 3 that updates the map is configured as a computer including a server processor 31 and a memory 32. The server processor 31 is configured using a processor such as a CPU. The memory 32 includes a RAM and a flash memory. The map server 3 includes a map database 33 which is a nonvolatile storage device storing map data. The map database 33 is configured such that data can be written, read, and deleted by the server processor 31. The map server 3 is configured to be able to communicate with the vehicle Ma via a communication device and a wide area communication network (not illustrated).

The map server 3 includes a report reception unit G1, a map update unit G2, and a distribution processing unit G3 as functional units implemented by the server processor 31 executing a predetermined map update program. The report reception unit G1 acquires probe data uploaded from a plurality of vehicles including the own vehicle, via the communication device. The report reception unit G1 provides probe data acquired from each vehicle, to the map update unit G2.

The map update unit G2 updates the map data stored in the map database 33 on the basis of the probe data transmitted from each vehicle. For example, a correction amount of a traffic signal position is determined by performing integration processing on the traffic signal positional deviation information reported for the same traffic signal from a plurality of vehicles, and the map data is updated. For example, for each of latitude, longitude, and altitude, a variance of the positional deviation amount of a traffic signal observed by a plurality of vehicles is calculated, and a median/average is adopted as a correction amount of the position of the traffic signal when the variance is less than a predetermined threshold. For an item whose variance is equal to or larger than the predetermined threshold, for example, a verification flag is set. The verification flag corresponds to a flag indicating data uncertain for registration as a map. The map update unit G2 may calculate a variance of traffic signal positions observed by a plurality of vehicles, and may adopt a median/average value as coordinates of the traffic signal when the variance is less than the predetermined threshold. For a traffic signal whose variance is equal to or larger than the predetermined threshold, for example, a verification flag may be set, and the update may be suspended. Evaluation of dispersion in the integration processing is not essential and may be omitted. The map update unit G2 may update an installation position of a traffic signal when continuously receiving reports indicating that the traffic signal position is deviated in the same direction, from a plurality of vehicles a predetermined number of times. The map update unit G2 preferably performs the integration processing by giving priority to, for example, by increasing a weight on, the traffic signal position observed when the error evaluation value ρ is smaller, over the traffic signal position observed when the error evaluation value ρ is larger. According to such a configuration, the accuracy of the installation position of the traffic signal recorded in the PD map can be further enhanced.

The map update unit G2 updates the map data at a predetermined cycle, for example. The update cycle may be daily, weekly, or monthly. The update may be performed in order from a traffic signal for which a predetermined number of pieces of probe data are accumulated. A number of required update reports, which is the number of pieces of probe data required to update position coordinates of one traffic signal, can be, for example, 10. The number of required update reports may also be 8, 12, or the like. It can be expected that the accuracy increases when the number of required update reports increases. By reducing the number of required update reports, real-time property can be enhanced.

The distribution processing unit G3 is a configuration that distributes map data in units of patches such as map tiles, on the basis of a request from a vehicle. For example, the map acquisition unit F2 of the vehicle requests the map server 3 for map data related to a current position and an area where the vehicle is scheduled to pass within a predetermined time. The distribution processing unit G3 distributes the map data on the basis of the request. The distribution processing unit G3 may be configured to voluntarily distribute the map data. For example, in a system configuration in which map data is stored in a vehicle and used, the updated map data may be distributed to each vehicle as difference map data. Position information of a three-dimensional structure such as a traffic signal is distributed in association with a road marking data such as a lane marking and a hatched zone in an intersection. The position information of the three-dimensional structure such as a traffic signal may be distributed in association with a traveling trajectory model for each lane and each traveling direction at the intersection. According to the above configuration, the position of the traffic signal can be updated as needed on the basis of the report from vehicles.

<Regarding Cooperation with Roadside Device and the Like>

Figure 9:
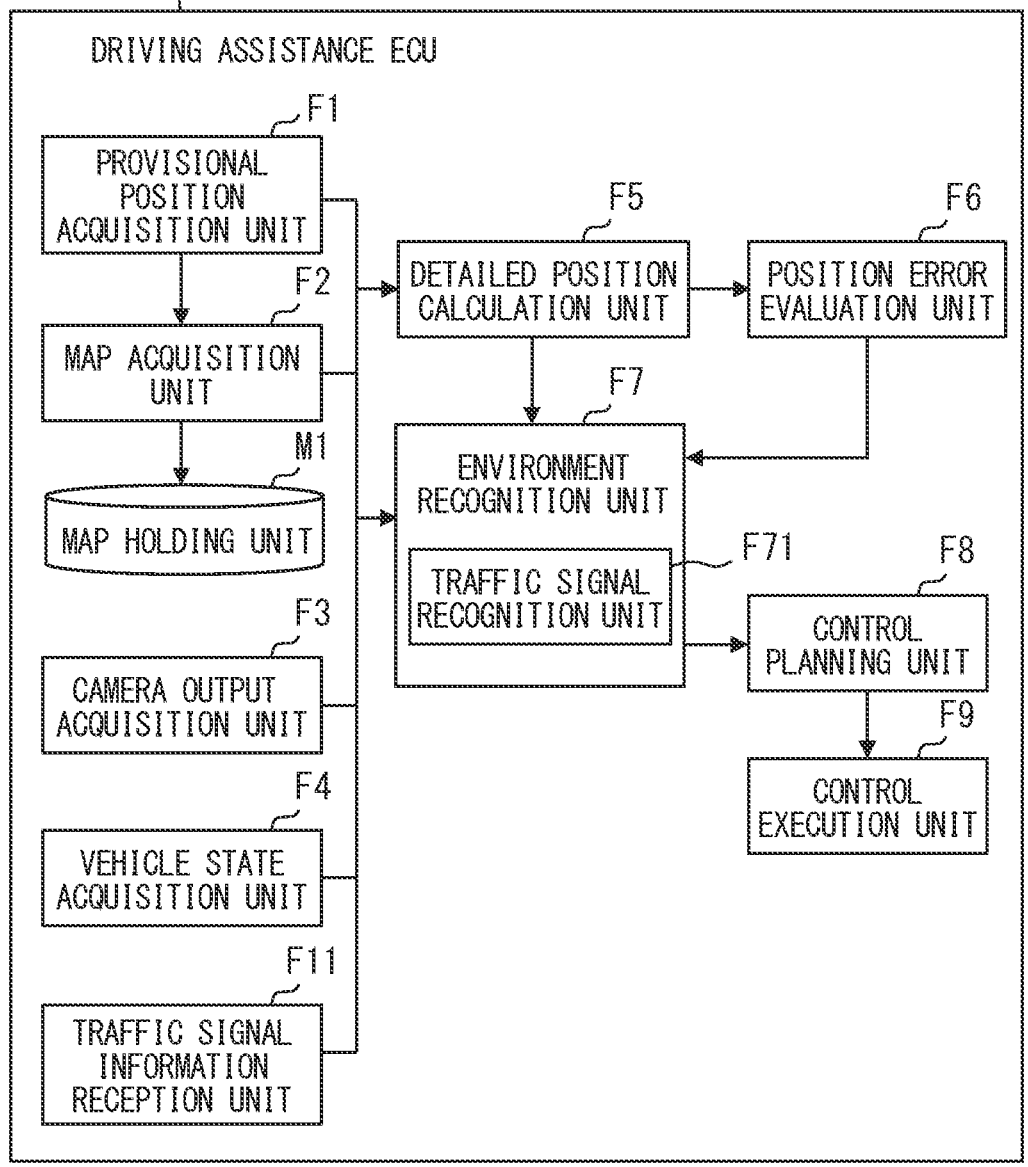
FIG. 9 is a diagram for explaining a configuration using traffic signal information transmitted from a roadside device.

The driving assistance ECU 20 may include a traffic signal information reception unit F11 as a functional unit as illustrated in FIG. 9. The traffic signal information reception unit F11 is a configuration that acquires traffic signal information, which is information on a front traffic signal, from a roadside device via the V2X in-vehicle device 14. The traffic signal information can be information including, for example, a distance to a front traffic signal, a current lighting state, a lighting cycle, a remaining time until the lighting state changes, and the like.

For example, when the traffic signal information reception unit F11 has successfully received the traffic signal information, the traffic signal recognition unit F71 recognizes the traffic signal by using the received traffic signal information. For example, when the traffic signal information provides notification that the current lighting state is blue, among blue lights, the traffic signal registered on the map is associated with the lighting device detected by the front camera 11. Once reception of traffic signal information from the roadside device is started, the traffic signal information is not always stably received until the traffic signal is passed. Even if traffic signal information can be acquired up to a point where the remaining distance Rd is 100 m, there are cases where reception becomes impossible due to communication trouble or radio wave shielding by a large vehicle thereafter. Therefore, in a case where the traffic signal information has been successfully received once, it is preferable to continue tracking so that the front camera 11 can recognize the lighting state, instead of relying only on the traffic signal information. As the tracking method, various methods can be adopted as described above.

In the configuration in which the lighting device corresponding to the traffic signal is tracked using a degree of similarity of a feature amount, there is a possibility that the lighting device is missed (that is, lost) at a timing when the lighting state of the traffic signal changes. This is because the color greatly changes as the lighting state of the traffic signal changes. In the configuration in which the lighting device corresponding to the traffic signal is tracked using a degree of color similarity, it is preferable to track the lighting device as a traffic signal by complementarily using the traffic signal information received by the traffic signal information reception unit F11. For example, a weight of color information to be used for tracking the lighting device may be lowered near a time point when the lighting state of the traffic signal changes indicated in the traffic signal information. Specifically, near the time point when the lighting state of the traffic signal changes indicated in the traffic signal information, the tracking may be performed by switching from a first tracking method using the degree of color similarity to a second tracking method not using the degree of color similarity. The second tracking method can be, for example, a method of performing tracking on the basis of a similarity between an estimated position based on the observed position at the previous time and an observed position at the current time. According to this configuration, it is possible to reduce a possibility that tracking of the lighting device as a traffic signal is interrupted due to a change in the lighting state. While the color information is used at a time point when a lighting device corresponding to a traffic signal is searched for, the weight of the color information in the tracking processing is lowered after the time point when the association is successful, so that it is possible to increase accuracy of finding the traffic signal and reduce a risk of loss.

Of course, the traffic signal information may be used not only for specifying a lighting device corresponding to a front traffic signal but also directly for the traffic signal passage assistance. For example, the control planning unit F8 may determine whether or not the vehicle stops in front of the traffic signal on the basis of the traffic signal information, or may create an acceleration/deceleration schedule. When the traffic signal information indicates that the traffic signal does not change to red for a predetermined time or more, the control planning unit F8 may establish a control plan for passing without stopping in front of the traffic signal. When changing to red is expected before the remaining distance Rd becomes less than a predetermined value on the basis of the traffic signal information, a control plan for decelerating to stop may simply be established. An acquisition source of the traffic signal information by wireless communication is not limited to a roadside device. The traffic signal information described above may be acquired from a center that manages and distributes an operating status of traffic signals. Normally, the traffic signal information wirelessly transmitted from an infrastructure is more reliable than an image recognition result. Thus, when the traffic signal information has been wirelessly received, the control plan may be executed on the basis of the traffic signal information acquired from the infrastructure rather than a lighting state of a traffic signal specified by the image recognition. However, there is a concern that false traffic signal information may be distributed by a malicious third party. On the basis of such a concern, the control plan may be implemented by preferentially using a lighting state of a traffic signal specified by the image recognition over the traffic signal information acquired from the infrastructure. In addition, authenticity of the received traffic signal information may be evaluated on the basis of consistency between the traffic signal information and the image recognition result, and then the control plan may be created on the basis of the traffic signal information.

<Modification of System Configuration>

Figure 10:
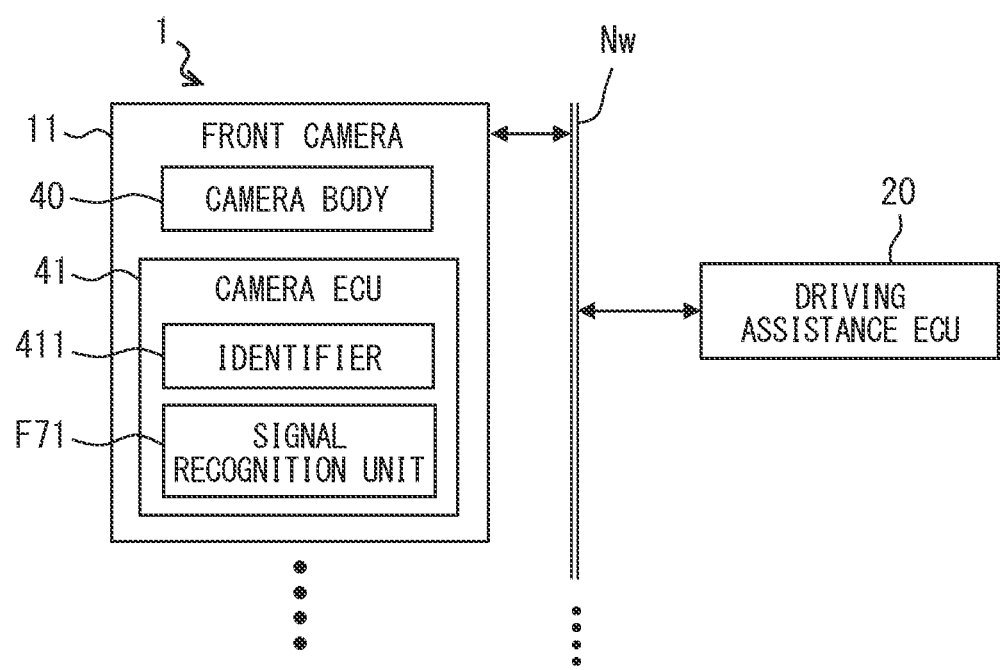
FIG. 10 is a diagram illustrating a modification of a system configuration.

In the above-described embodiment, the configuration in which the driving assistance ECU 20 includes the traffic signal recognition unit F71 has been disclosed, but an arrangement mode of various functional units is not limited thereto. As illustrated in FIG. 10, the camera ECU 41 may include the traffic signal recognition unit F71. As described above, the camera ECU 41 and the driving assistance ECU 20 may be integrated. In other words, the driving assistance ECU 20 may have the function as the camera ECU 41. That is, the front camera 11 may be configured to output image data to the driving assistance ECU 20 so that the driving assistance ECU 20 executes processing from object detection to type identification.

In addition, the driving assistance ECU 20 may be configured to be inputted with detection results of various peripheral monitoring sensors such as millimeter wave radar, sonar, and LiDAR. For example, the environment recognition unit F7 may be configured to recognize a traveling environment by sensor fusion processing of integrating detection results of the millimeter wave radar and the LiDAR and a detection result of the front camera 11 with a predetermined weight. In the above description, the processing of recognizing a traffic signal by using an image of the front camera 11 has been exemplified, but the camera for recognizing the traffic signal is not limited to the front camera 11. A traffic signal may be detected using an image frame generated by a rear camera, a right side camera, or a left side camera. The above-described method of recognizing a traffic signal can also be applied to image data captured by an in-vehicle camera other than front camera 11, such as a side camera.

<Additional Remarks>

The control unit, the processing unit, and the method thereof described in the present disclosure may be realized by a dedicated computer constituting a processor programmed to execute one or a plurality of functions embodied by a computer program. The device and the method thereof described in the present disclosure may be realized by using a dedicated hardware logic circuit. The device and the method thereof described in the present disclosure may be realized by one or more dedicated computers configured by a combination of a processor that executes a computer program and one or more hardware logic circuits. The computer program may be stored in a computer-readable non-transition tangible recording medium as an instruction to be executed by a computer.

That is, means and/or functions provided by the processing unit 21 and the like can be provided by software recorded in a substantive memory device and a computer that executes the software, only software, only hardware, or a combination thereof. For example, some or all of the functions of the processing unit 21 may be realized as hardware. A mode in which a certain function is realized as hardware includes a mode in which the function is realized using one or more ICs or the like. The processing unit 21 may be realized by using an MPU, a GPU, or a data flow processor (DFP) instead of the CPU. The processing unit 21 may be realized by combining a plurality of types of arithmetic processing devices such as a CPU, an MPU, and a GPU. The processing unit 21 may be realized as a system-on-chip (SoC). The various processing units may be realized by using a field-programmable gate array (FPGA) or an application specific integrated circuit (ASIC). The various programs may simply be stored in a non-transitory tangible storage medium. As the storage medium of the program, various storage media such as a hard-disk drive (HDD), a solid state drive (SSD), an erasable programmable ROM (EPROM), a flash memory, and a secure digital (SD) card can be adopted.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A traffic signal recognition device for recognizing a traffic signal present around a vehicle, the traffic signal recognition device comprising:
 a processor configured to:
 acquire a position of the vehicle;
 acquire an on-map traffic signal position based on the position of the vehicle, the on-map traffic signal position being a position of the traffic signal registered in map data;
 acquire an observed lighting position that is position information of a lighting device detected using an image frame captured by an in-vehicle camera;
 determine whether the lighting device corresponds to the traffic signal based on a proximity that is a difference between the on-map traffic signal position and the observed lighting position, wherein
 calculate a remaining distance from the position of the vehicle to the on-map traffic signal position;
 determine whether the remaining distance is less than a limit distance; and
 transmit an error signal indicating failure of recognition of the traffic signal registered in the map data to a map server when the remaining distance is less than the limit distance and the lighting device corresponding to the traffic signal has not been specified.

2. The traffic signal recognition device according to claim 1, wherein
 the error signal includes at least one of current position information, observation time information, identification information of the traffic signal, or model information of the in-vehicle camera.

3. The traffic signal recognition device according to claim 1, wherein
the processor is configured to determine that the lighting device corresponds to the traffic signal based on a fact that the proximity is less than a predetermined deemed threshold.

4. The traffic signal recognition device according to claim 1, wherein
the processor is configured to acquire an error evaluation value indicating a degree of an error in the position of the vehicle, wherein
the processor is configured to determine whether the lighting device corresponds to the traffic signal in condition where the error evaluation value is less than a predetermined error threshold.

5. The traffic signal recognition device according to claim 4, wherein
the processor is configured to transmit observation result information to a map server provided outside the vehicle in condition where the error evaluation value is less than the error threshold, the observation result information directly or indirectly indicating an observed position of the lighting device corresponding to the traffic signal.

6. The traffic signal recognition device according to claim 1, wherein
the processor is configured to specify a position coordinate of the vehicle on a map based on position information of a predetermined landmark detected using an image frame captured by a front camera and position information of the landmark registered in the map data,
the landmark includes at least one of a guide sign installed along a road, a traffic signal, a pole, a commercial signboard, or a predetermined road marking, and
the processor is configured to use the landmark other than the traffic signal at least at night.

7. The traffic signal recognition device according to claim 1, wherein
the processor is configured to notify a user of information related to a recognition state of the traffic signal when the remaining distance is less than a predetermined distance and the lighting device corresponding to the traffic signal has not been specified.

8. The traffic signal recognition device according to claim 1, wherein
the processor is configured to receive traffic signal information from a communication device provided outside the vehicle, the traffic signal information being information on the traffic signal, and
the processor is configured to specify the lighting device corresponding to the traffic signal by using the traffic signal information when the processor receives the traffic signal information.

9. The traffic signal recognition device according to claim 8, wherein
the processor is configured to track the lighting device as the traffic signal when the lighting device corresponding to the traffic signal has been specified, and
the processor is configured to change a method of tracking the lighting device as the traffic signal over time based on the traffic signal information.

10. The traffic signal recognition device according to claim 1, wherein
the processor is configured to suspend transmission of the error signal to the map server when the remaining distance is greater than or equal to the limit distance and the lighting device corresponding to the traffic signal has not been specified.

11. A traffic signal recognition method for recognizing a traffic signal present around a vehicle, the traffic signal recognition method being executed by at least one processor, the traffic signal recognition method comprising:
acquiring a position of the vehicle;
acquiring an on-map traffic signal position based on the acquired position of the vehicle, the on-map traffic signal position being a position of the traffic signal registered in map data;
acquiring an observed lighting position that is position information of a lighting device detected using an image frame captured by an in-vehicle camera;
determining whether the lighting device corresponds to the traffic signal based on a proximity that is a difference between the acquired on-map traffic signal position and the acquired observed lighting position; and
calculating a remaining distance from the position of the vehicle to the on-map traffic signal position;
determining whether the remaining distance is less than a limit distance; and
transmitting an error signal indicating failure of recognition of the traffic signal registered in the map data to a map server when the remaining distance is less than the limit and the lighting device corresponding to the traffic signal has not been specified.

12. A vehicle control device for performing a vehicle control according to a recognition state of a traffic signal present around a vehicle, the vehicle control device comprising:
a processor configured to:
acquire a position of the vehicle;
acquire an on-map traffic signal position based on a position of the vehicle, the on-map traffic signal position being a position of the traffic signal registered in map data;
acquire an observed lighting position that is position information of a lighting device detected using an image frame captured by an in-vehicle camera; and
determine whether the lighting device corresponds to the traffic signal based on a proximity that is a difference between the on-map traffic signal position and the observed lighting position, wherein
calculate a remaining distance from the position of the vehicle to the on-map traffic signal position;
determine whether the remaining distance is less than a limit distance;
determine whether the remaining distance is less than a cancel advance notice distance larger than the limit distance;
notify a user that the vehicle control is not performed when the remaining distance is less than the limit distance and a traffic signal has not been recognized, and
give an advance notice to the user that there is a possibility that the vehicle control is not performed when the remaining distance is greater than or equal to the limit distance and less than the cancel advance notice distance and a traffic signal has not been recognized.

* * * * *